(12) United States Patent
Cho et al.

(10) Patent No.: US 11,823,464 B2
(45) Date of Patent: Nov. 21, 2023

(54) MESSAGE-BASED IMAGE PROCESSING METHOD AND ELECTRONIC DEVICE IMPLEMENTING SAME

(71) Applicant: Samsung Electronics Co., Ltd., Gyeonggi-do (KR)

(72) Inventors: Hyoungtak Cho, Gyeonggi-do (KR); Jehyun Lee, Gyeonggi-do (KR); Kiho Cho, Gyeonggi-do (KR); Jongsung Joo, Gyeonggi-do (KR); Areum Choi, Gyeonggi-do (KR); Inyoung Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 407 days.

(21) Appl. No.: 17/298,710

(22) PCT Filed: Nov. 10, 2020

(86) PCT No.: PCT/KR2020/015701
§ 371 (c)(1),
(2) Date: Jun. 1, 2021

(87) PCT Pub. No.: WO2021/096195
PCT Pub. Date: May 20, 2021

(65) Prior Publication Data
US 2022/0051029 A1  Feb. 17, 2022

(30) Foreign Application Priority Data
Nov. 11, 2019  (KR) .......................... 10-2019-0143325

(51) Int. Cl.
*G06T 7/11*   (2017.01)
*G06V 20/05*  (2022.01)
(Continued)

(52) U.S. Cl.
CPC .............. *G06V 20/05* (2022.01); *G06F 18/22* (2023.01); *G06T 7/50* (2017.01); *G06T 7/70* (2017.01);
(Continued)

(58) Field of Classification Search
CPC ...... G06V 10/82; G06V 20/58; G06V 10/764; G06V 20/588; G06V 20/56; G06V 10/255;
(Continued)

(56) References Cited

U.S. PATENT DOCUMENTS

2017/0221366 A1  8/2017 An et al.
2019/0166536 A1  5/2019 Kim et al.
(Continued)

FOREIGN PATENT DOCUMENTS

JP       2013-168019 A     8/2013
KR  10-2014-0055816 A     5/2014
(Continued)

*Primary Examiner* — Quan M Hua
(74) *Attorney, Agent, or Firm* — Cha & Reiter, LLC

(57) ABSTRACT

An electronic device according to various embodiments disclosed in this document may include a first communicator supporting V2X communication, a controller, and a memory, wherein the memory stores instructions which, when executed, cause the controller to: receive at least one V2X message through the first communicator; determine whether to capture an image, based on the at least one V2X message; in response to the determination to capture the image, determine a region of interest, based on the at least one V2X message; obtain an image including the determined region of interest, through at least one imaging device electrically connected to the electronic device; identify an object included in the obtained image; match the identified object with the at least one V2X message; and generate an image with which the at least one V2X message matching (Continued)

the identified object is combined. Other various embodiments are possible.

20 Claims, 18 Drawing Sheets

(51) Int. Cl.
G06T 7/50 (2017.01)
G06T 7/70 (2017.01)
G06V 10/25 (2022.01)
G06T 11/00 (2006.01)
H04L 67/12 (2022.01)
G06F 18/22 (2023.01)
H04N 23/80 (2023.01)
G06F 3/04842 (2022.01)

(52) U.S. Cl.
CPC ............. *G06T 11/00* (2013.01); *G06V 10/25* (2022.01); *H04L 67/12* (2013.01); *H04N 23/80* (2023.01); *G06F 3/04842* (2013.01); *G06T 2200/24* (2013.01); *G06T 2207/30168* (2013.01); *G06T 2207/30252* (2013.01)

(58) Field of Classification Search
CPC .... G06V 10/143; G06V 10/25; G06V 10/776; G06V 10/774; G06V 10/803; G06V 2201/08; G06V 40/10; G06V 20/52; G06V 20/582; G06V 20/597; G06V 20/54; G06N 3/045; G06N 20/00; G06N 3/084; G06N 3/08; G06N 3/0464; G06N 3/048; G06T 7/73; G06T 2207/20084; G06T 2210/12; G06T 7/60; G06T 7/70; G06T 2207/20021; G06T 5/002; G06T 7/11; G06T 7/136; G06T 7/174; G06T 7/248; G06T 7/254

See application file for complete search history.

(56) References Cited

U.S. PATENT DOCUMENTS

2019/0311614 A1* 10/2019 Yang ...................... G08G 1/052
2020/0023797 A1* 1/2020 Volos .................... B60R 21/013
2020/0286382 A1* 9/2020 Avedisov ................ G08G 1/16

FOREIGN PATENT DOCUMENTS

| KR | 10-2014-0106286 A | 9/2014 |
| KR | 10-2016-0097838 A | 8/2016 |
| KR | 10-1755944 B1 | 7/2017 |
| KR | 10-2018-0052433 A | 5/2018 |
| KR | 10-2018-0062738 A | 6/2018 |
| KR | 10-1951035 B1 | 5/2019 |
| KR | 10-2019-0060259 A | 6/2019 |

* cited by examiner

MESSAGE-BASED IMAGE PROCESSING METHOD AND ELECTRONIC DEVICE IMPLEMENTING SAME

CROSS REFERENCE TO RELATED APPLICATIONS

This application is a National Phase Entry of PCT International Application No. PCT/KR2020/015701, which was filed on Nov. 10, 2020, and claims a priority to Korean Patent Application No. 10-2019-0143325, which was filed on Nov. 11, 2019, the contents of which are incorporated herein by reference.

TECHNICAL FIELD

Various embodiments disclosed in this document relate to a method for image processing based on a message and an electronic device implementing the same.

BACKGROUND ART

In relation to an electronic device, communication for processing information related to a moving vehicle is also developing through the development of communication.

A technology for recording and analyzing events occurring in traffic conditions is developing through an image capturing device in a vehicle.

In addition, a so-called vehicle to everything (V2X) technology is being studied, and a technology which provides information through wired/wireless networks centered around a vehicle is developing.

The V2X technology may include vehicle to vehicle (V2V) communication, vehicle to road infrastructure (V2I) communication, vehicle to cloud (vehicle to network: V2N) communication, or vehicle to pedestrian (V2P) communication.

DISCLOSURE OF INVENTION

Technical Problem

In the case of a method for photographing and analyzing a traffic condition by using an image capturing device in a vehicle, it may be difficult to accurately analyze a traffic condition since driving information relating to an external vehicle cannot be accurately identified.

In the case of a method for analyzing a traffic condition through a V2X message based on V2X communication, the reliability of the message may be lowered since the method is based on GNSS information, and thus it may be difficult to accurately analyze a traffic condition.

Solution to Problem

Various respective aspects and features of the invention are defined in the appended claims. Combinations of features from the dependent claims may be combined with features of the independent claims as appropriate and not merely as explicitly set out in the claims.

Furthermore, one or more selected features of any one embodiment described in this disclosure may be combined with one or more selected features of any other embodiment described herein, provided that the alternative combination of features at least partially alleviates the one or more technical problem discussed in this disclosure or at least partially alleviates a technical problem discernable by the skilled person from this disclosure and further provided that the particular combination or permutation of embodiment features thus formed would not be understood by the skilled person to be incompatible.

Two or more physically distinct components in any described example implementation of this disclosure may alternatively be integrated into a single component where possible, provided that the same function is performed by the single component thus formed. Conversely, a single component of any embodiment described in this disclosure may alternatively be implemented as two or more distinct components to achieve the same function, where appropriate.

An electronic device according to various embodiments disclosed in this document may include: a first communication circuit supporting V2X communication; a processor operatively connected to the first communication circuit; and a memory operatively connected to the processor, wherein the memory stores instructions which, when executed, cause the processor to: receive at least one V2X message through the first communication circuit; determine whether to capture an image, based on the at least one V2X message; in response to the determination to capture the image, determine a region of interest, based on the at least one V2X message; obtain an image including the determined region of interest, through at least one camera electrically connected to the electronic device; identify an object included in the obtained image; match the identified object with the at least one V2X message; and generate an image with which the at least one V2X message matching the identified object is combined.

An image processing method of an electronic device according to various embodiments disclosed in this document may include: receiving at least one V2X message; determining whether to capture an image, based on the at least one V2X message; in response to the determination to capture the image, determining a region of interest, based on the at least one V2X message; obtaining an image including the determined region of interest, through at least one camera electrically connected to the electronic device; identifying an object included in the obtained image; matching the identified object with the at least one V2X message; and generating an image with which the at least one V2X message matching the identified object is combined.

It is an aim of certain embodiments of the disclosure to solve, mitigate or obviate, at least partly, at least one of the problems and/or disadvantages associated with the prior art. Certain embodiments aim to provide at least one of the advantages described below.

Advantageous Effects of Invention

An electronic device according to various embodiments can perform matching by comparing information obtained by analyzing a V2X message with information obtained by analyzing an image, and generate an image with which information included in the V2X message is combined, so as to accurately analyze various events occurring in traffic conditions.

MODE FOR THE INVENTION

Figure 1:
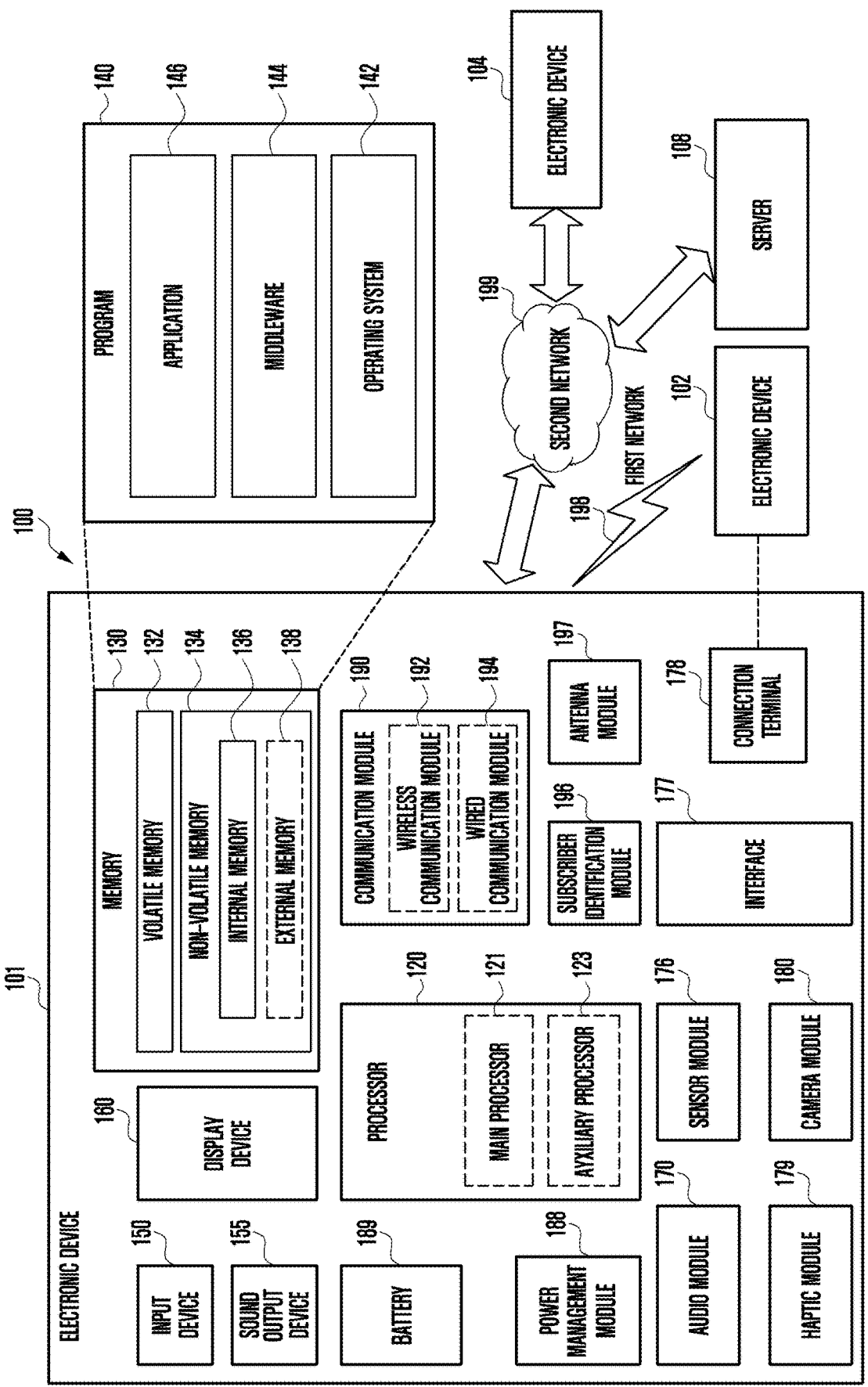
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
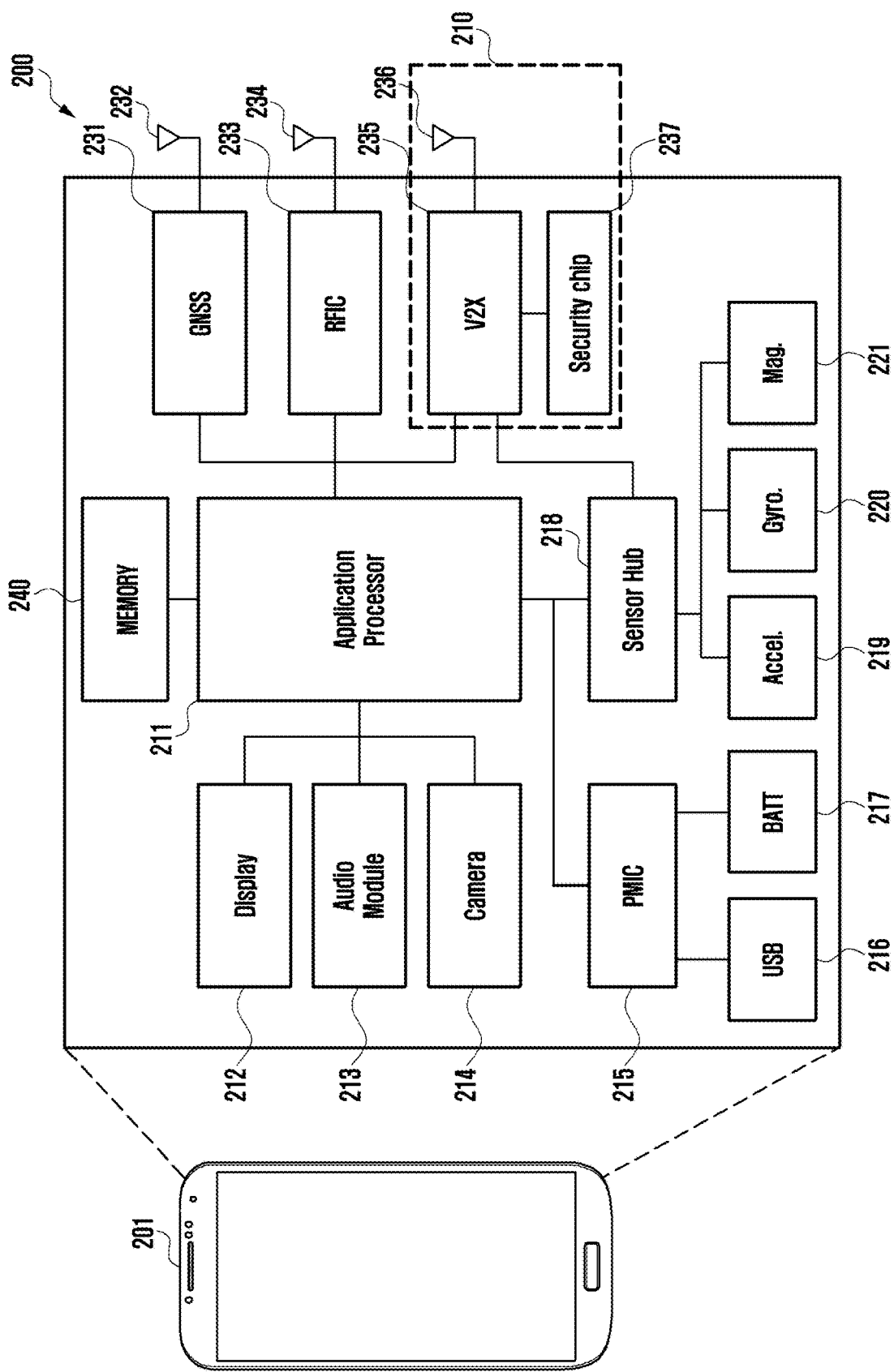
FIG. 2A to FIG. 2C are block diagrams of an electronic device according to various embodiments.
Figure 2B:
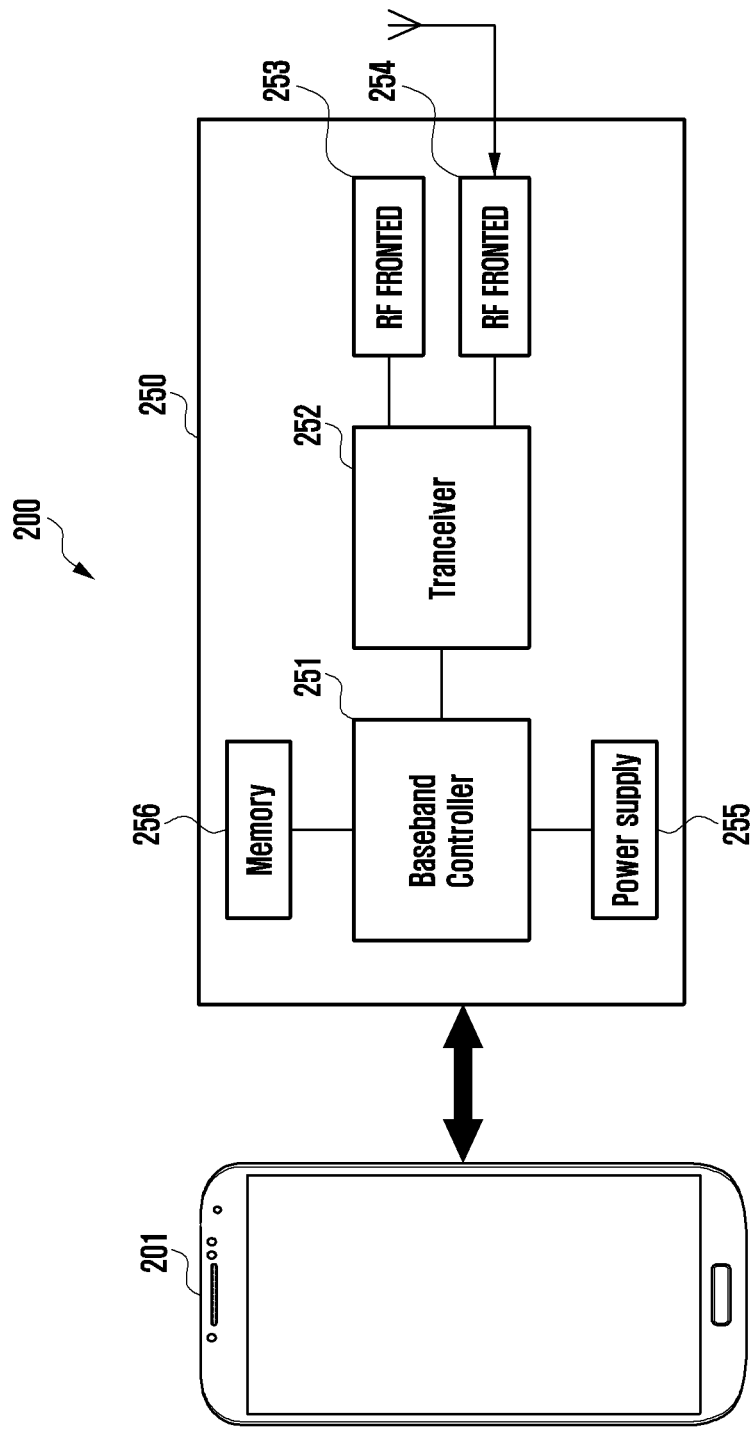
Figure 2C:
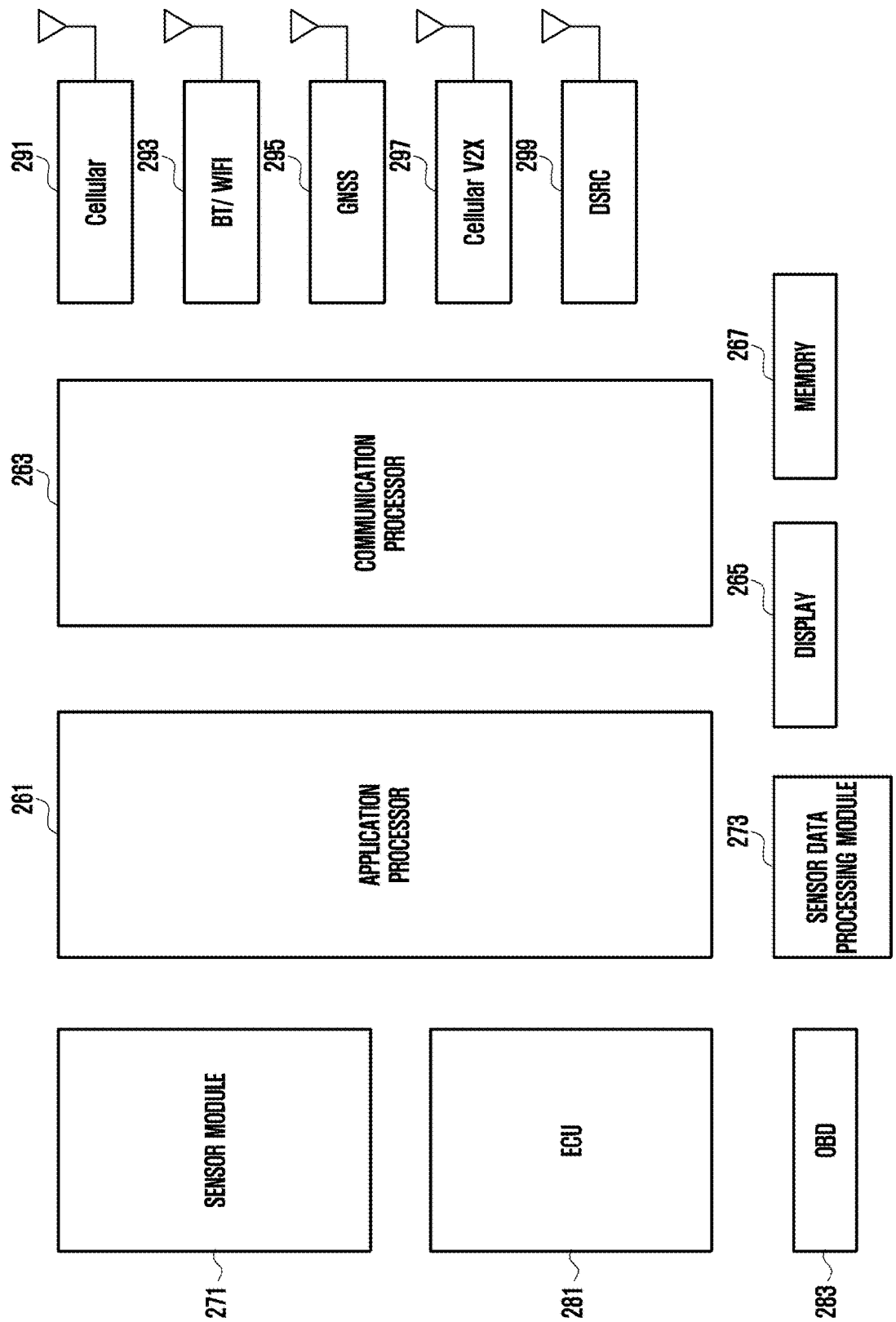

FIG. 2A to FIG. 2C are block diagrams of an electronic device according to various embodiments.

An electronic device according to various embodiments disclosed in this document may include various types of devices. The electronic device may include, for example, a portable communication device (e.g., a smart phone) and an electronic device for a vehicle, and may correspond to a vehicle itself. When the electronic device is a portable communication device, the electronic device may be installed in or attached to a vehicle and used.

According to various embodiments, the electronic device may include a wireless communication system having high speed and low delay characteristics in a vehicle environment having active mobility. The electronic device according to various embodiments may be an electronic device supporting V2X communication.

In various embodiments, an electronic device 201 may require a wireless communication system having high speed, short range, and low delay characteristics in a vehicle environment having active mobility. To this end, the electronic device 201 complies with the wireless access in vehicular environments (WAVE) communication standard, and the WAVE communication standard may include the institute of electrical and electronics engineers (IEEE) 802.11p and IEEE 1609 standards.

Referring to FIG. 2A, the electronic device 201 (e.g., the electronic device 101 of FIG. 1), may include a control means 211 (e.g., an application processor: AP, and the processor 120 of FIG. 1), a display means 212 (e.g., a display, and the display device 160 of FIG. 1), an audio module 312, an imaging means 214 (e.g., a camera, and the camera module 180 of FIG. 1), a PMIC 215, a USB interface 216, a battery 217, a sensor hub 218, an acceleration sensor 219, a gyroscope sensor 220, a geomagnetic sensor 221, a GNSS module 231, a GNSS antenna 232, an RFIC 233, an RFIC antenna 234, a communication means (e.g., a V2X module 235, and the communication module 190 of FIG. 1), a V2X antenna 236, a security module (security chip) 237, or a memory 240.

According to various embodiments, the electronic device 201 may include a V2X communication module 210 which enables V2X communication to be supported. The V2X communication module 210 may include the V2X module 235 and the security chip 237.

The V2X communication according to various embodiments may include, for example, C-V2X communication which is V2X communication based on cellular communication. The C-V2X communication may comply with the 3GPP standard. In the case of the C-V2X communication, communication may be performed using an existing mobile communication base station.

The V2X communication according to various embodiments may include, for example, wireless access in vehicular environments (WAVE) communication based on dedicated short range communication (DSRC). The WAVE communication may comply with the IEEE 802.11p and IEEE 1609 standards. In the case of the WAVE communication, since the WAVE communication is based on Wi-Fi, a dedicated roadside unit (RSU) may be installed to perform communication.

The control means 211 (e.g., the AP, and the main processor 121 of FIG. 1) may control to perform the overall operations of the electronic device 201. For example, as a command stored in the memory 240 (e.g., the memory 130 of FIG. 1) is executed, the control means may control at least one piece of hardware to perform an operation corresponding to the command. The AP 211 may have either a sleep state or an automatic activation (wake-up) state. In the case of a sleep state, the AP 211 may not perform any particular operation, and accordingly, consumption of the battery 217 by the AP 211 may be reduced. The AP 211 may be switched to an automatic activation (wake-up) state in response to various conditions as triggers, or may be switched to one of various states of the electronic device 201. The various states may be states associated with at least one of transmission or reception of at least one of PSM or BSM. In the automatic activation (wake-up) state, the AP 211 may operate according to the command stored in the memory 240. The AP 211 may obtain various types of information such as data from various sensors such as the acceleration sensor 219, the gyro sensor 220, or the geometric sensor 221, data from the GNSS module 231, and an image analysis result obtained by the camera 214. The AP 211 may control the V2X module 235 and the V2X antenna 236 to transmit a communication signal including the obtained information. Although not shown, a front end module (FEM) may be connected to a space between the V2X module 235 and the V2X antenna 236.

According to various embodiments, when C-V2X communication is supported, the communication means 235 (e.g., the V2X module) may be implemented as a chipset capable of performing both cellular-based cellular V2X (C-V2X) data processing and vehicle safety-related data processing. In the above case, for example, the V2X module 235 may be implemented as a chipset designed to process data according to the 3GPP standard. Release 14 of the 3GPP defines the standard for two transmission modes that enable C-V2X direct communication and C-V2X network communication. The V2X antenna 236 may perform transmission or reception of a communication signal for C-V2X and transmission or reception of a communication signal associated with vehicle safety (e.g., an LTE-V2X communication signal, a 5G-V2X communication signal, or an NR-V2X communication signal). The communication signal for C-V2X may use a commercial frequency band as well as a frequency band having a center frequency of 5 GHz. Although the V2X antenna 236 is shown as being one antenna, this is merely an example, and thus a plurality of antennas may be implemented as required by the communication standard. The security module 237 may store information required for processing data for C-V2X, and the V2X module 235 may process data for C-V2X by using the stored information.

According to various embodiments, when WAVE communication is supported, the V2X module 235 may be implemented as a chipset capable of performing both data processing for Wi-Fi and vehicle safety-related data (e.g., data for WAVE) processing. In the above case, for example, the V2X module 235 may be implemented as a chipset designed to process data by IEEE 802.11 a/c/n/p. The V2X antenna 236 may perform transmission or reception of a communication signal for Wi-Fi and transmission or reception of a communication signal associated with vehicle safety (e.g., a communication signal for WAVE). For example, the communication signal for Wi-Fi may use a frequency band having a center frequency of 5 GHz, and the communication signal for WAVE may use a frequency band having a center frequency of 5.8 GHz, which has a relatively small difference with the frequency band for Wi-Fi, so that the V2X antenna 236 may perform transmission or reception of both of the two communication signals. The security module 237 may store information required for processing data for WAVE, and the V2X module 235 may process data for WAVE by using the stored information. For example, the security module 237 may store various types of information such as information used for WAVE modulation/demodulation, information used for encryption/decryption, and information used for processing a message. The V2X module 235, the AP 211, or the sensor hub 218 may access the security module 237 directly or indirectly. The security module 237 may be implemented integrally with the memory 240 or may be implemented as different hardware, depending on the implementation. The V2X module 235 may receive data from the AP 211, process the received data to generate an electrical signal corresponding to the communication signal for WAVE, and provide the generated signal to the V2X antenna 236. Otherwise, the V2X module 235 may receive data from the sensor hub 218, process the received data to generate an electrical signal corresponding to the communication signal for WAVE, and provide the generated signal to the V2X antenna 236. For example, when the AP 211 is in an automatic activation (wake-up) state, the V2X module 235 may receive data from at least one of the AP 211 or the sensor hub 218. When the AP 211 is in a sleep state, the V2X module 235 may receive data from the sensor hub 218. The sensor hub 218 (e.g., the coprocessor 123 of FIG. 1) may include at least one of a processing circuit capable of obtaining and processing data from at least one of sensors (e.g., the acceleration sensor 219, the gyro sensor 220, or the geomagnetic sensor 221) or the GNSS module 231, or a storage circuit capable of temporarily or non-temporarily storing the processed data. The V2X module 235 may include at least one of a processing circuit capable of processing the communication signal for WAVE, a transmission circuit capable of transmitting a communication signal, or a reception circuit capable of receiving a communication signal. The V2X module 235 may perform scanning for receiving a communication signal every designated period, analyze a result of the scanning, and operate even when the AP 211 is in the sleep state. The V2X module 235 may receive a communication signal and automatically activate (wake up) the AP 211 when data included in the communication signal satisfies a designated condition. In the case where the AP 211 is in the sleep state in a general Wi-Fi operation, if a connection has been established or a communication signal is received from an access point having a designated condition, the AP 211 may be automatically activated (woken up). Since information on the designated condition or the connected access point may be updated, information of a storage of the V2X module 235 may be changed by the AP 211 when the update is required, and the V2X module 235 may operate by the changed information. The V2X module 235 may include a transmission circuit for transmitting a communication signal and a reception circuit for processing a communication signal from another electronic device. The electronic device 201 may selectively activate the transmission circuit or the reception circuit. For example, the electronic device may scan a communication signal from another entity without transmitting the communication signal, by deactivating the transmission circuit and activating the reception circuit. In this document, a module for performing communication may be referred to as a communication circuit.

When it is determined that a current location of the electronic device 201 corresponds to a dangerous area, and that the electronic device 201 is located outside a transportation means, the AP 211 or the sensor hub 218 may correspondingly activate the transmission circuit of the V2X module 235 and control to transmit a communication signal (e.g., a communication signal including PSM) including data obtained through the activated transmission circuit. The AP 211 or the sensor hub 218 may control to transmit the communication signal by using at least a part of geographic information for a designated area. For example, when the electronic device 201 enters the designated area, the electronic device may receive the geographic information for the designated area via a roadside base station (e.g., a roadside unit (RSU)) or a server, and store the received geographic information in the memory 240. In various embodiments, the memory 240 may store information on a dangerous area. The geographic information according to various embodiments may be data represented by a numerical value associated with at least one of a designated latitude, longitude, or altitude, or data in the form of an image. When it is determined that location information of the electronic device 201 identified through the GNSS module 231 belongs to a designated location (e.g., a dangerous area, etc.), the AP 211 or the sensor hub 218 may control the V2X module 235 to transmit a communication signal. When the AP 211 is in the sleep state, the sensor hub 218 may receive only at least a part of the geographic information for the designated area from the memory 240 and store the received geographic information, and compare the stored geographic information with the current location of the electronic device 201 identified through the GNSS module 231. The sensor hub 218 may determine whether to transmit a communication signal, based on a result of the comparison.

The display means 212 (e.g., the display, and the display device 160 of FIG. 1) may display various graphical objects (e.g., a graphic user interface (GUI)) associated with vehicle safety. In various embodiments, the display 212 may display a graphical object capable of activating whether to transmit or receive a V2X message, and the AP 211 may transmit or receive the V2X message according to an input from a user. An audio module 213 (e.g., the audio module 170 of FIG. 1) may output a vehicle-related warning sound. The imaging means 214 (e.g., the camera, and the camera module 180 of FIG. 1) may capture an image, and the AP 211 may determine whether transmission and reception of the V2X message are activated using the image received from the camera 214. The PMIC 215 (e.g., the power management module 188 of FIG. 1) may control at least one of a voltage and a current of power from the battery 217 (e.g., the battery 189 of FIG. 1) to be a numerical value suitable for each hardware, and provide the resulting data. A cable for wired power transmission may be connected via the USB interface 216 (e.g., the interface 177 of FIG. 1), and the electronic device 201 may receive power via the USB interface 216 (e.g., the interface 177). The RFIC 233 may be implemented as, for example, a chipset for data communication, and generate an electrical signal corresponding to a signal for data communication, based on data from the AP 211, to provide the generated signal to an RFIC antenna 234. The acceleration sensor 219 may identify acceleration of the electronic device 201, the gyro sensor 220 may identify rotation information thereof, and the geomagnetic sensor 221 may identify geomagnetic information thereof. The AP 211 or the sensor hub 218 may include information in a communication signal (e.g., a communication signal including PSM, etc.) to be transmitted via the V2X module 235 by using data from various sensors (e.g., the acceleration sensor 219, the gyro sensor 220, or the geometric sensor 221) or the GNSS module 231.

In various embodiments, the electronic device 201 may not include the sensor hub 218. In this case, the AP 211 may be always in the automatic activation (wake-up) state or may be automatically activated (woken up) periodically to determine whether to transmit a communication signal.

In various embodiments, the AP 211 or the sensor hub 218 may execute a vulnerable road user (VRU) safety application. The VRU safety application may be an application capable of generating the above-described BSM or PSM. The VRU safety application may determine a location, direction, speed, and time of the electronic device 201, or a relative location of the electronic device with other entities, based on at least a part of data from the GNSS module 231, data obtained from a Bluetooth low energy (BLE) positioning system, and data collected from various sensors (e.g., the acceleration sensor 219, the gyro sensor 220, or the geometric sensor 221). The VRU safety application may generate PSM according to a detected event or may determine a time point when the corresponding PSM is transmitted.

In various embodiments, the AP 211 or the sensor hub 218 may select one of various states of the electronic device 201, and accordingly determine a transmission or reception mode of PSM or BSM. The AP 211 or the sensor hub 218 may control a transmission or reception mode of the V2X module 235 according to the determined transmission or reception mode.

Referring to FIG. 2B, the electronic device 201 may perform V2X communication through communication between external electronic devices 250 supporting the V2X communication. The external electronic device 250 may be a dongle-type V2X communication module. The external electronic device 250 may include a baseband control means 251, a transceiver 252, and/or RF frontends 253 and 254 connected to the transceiver 252.

In an embodiment, the baseband control means 251 may perform a control of a frequency band obtained by all signals used to modulate a designated carrier.

In an embodiment, the transceiver 252 and the RF frontends 253 and 254 connected to the transceiver 252 may perform V2X communication according to the V2X communication standard under the control of the baseband control means 251. For example, the transceiver and the RF frontends may perform C-V2X communication according to the 3GPP communication standard, or perform WAVE communication according to the IEEE communication standard.

The external electronic device is not limited to this, and the external electronic device 250 may include, for example, a USB connector (not shown) for connecting the electronic device 201 and the external electronic device 250, a power supply 255 for supplying power to the external electronic device 250, and/or a memory 256 including a serial peripheral interface (SPI) FLASH memory.

FIG. 2C is a block diagram of an electronic device in the form of an electronic device for a vehicle supporting V2X communication according to various embodiments.

Referring to FIG. 2C, the electronic device 201 according to various embodiments may include a control means 261 (e.g., an application processor, and the main processor 121 of FIG. 1), an auxiliary control means 263 (e.g., a communication processor, and the coprocessor 123 of FIG. 1), a sensor module 271 (e.g., the sensor module 176 of FIG. 1), a sensor data processing module 273, a display means 265 (e.g., a display, and the display device 160 of FIG. 1), a memory 267 (e.g., the memory 130 of FIG. 1), at least one communication means (e.g., communication circuits 291, 293, 295, 297, and 299, and the communication module 190 of FIG. 1), an electronic control means 281 (electronic control unit: ECU), or a vehicle diagnostic module 293 (on-board diagnostics: OBD). Even when a part of the configurations shown in FIG. 2C is omitted or substituted, there will be no problem in implementing various embodiments disclosed in this document, and even when a part of the elements shown in FIGS. 1 and 2A is added, there will be no problem in implementing various embodiments disclosed in this document. The contents overlapping with the contents described in FIG. 2A will be omitted.

The communication processor 263 according to various embodiments may be a coprocessor which manages a data link and converts a protocol in a data communication network. The communication processor 263 according to various embodiments may be configured separately from a main processor 261 or may be implemented with the main processor 261 as one processor.

A plurality of electronic control units (ECUs) 281 according to various embodiments may be a device which controls a state of a vehicle. For example, the ECU 281 may control states of an engine, an automatic transmission, and an ABS of a vehicle. The vehicle diagnostic module 283 (on-board diagnostics: OBD) according to various embodiments may be a diagnostic/monitoring system in which an engine control system of a vehicle is integrated. For example, the OBD 283 may monitor a system related to exhaust or evaporation gas of a vehicle.

The electronic device 201 according to various embodiments may be electrically connected to at least one camera installed in or attached to the electronic device 201. For example, the electronic device 201 may obtain an image through the electrically connected at least one camera.

At least one communication circuit according to various embodiments may include a communication means (e.g., a cellular communication circuit 291, a BT/Wi-Fi communication circuit 293, a GNSS module 295, a C-V2X communication circuit 297, or a DSRC communication-based WAVE communication circuit 299).

The cellular communication circuit 291 according to various embodiments may be configured to be connected to a cellular network (e.g., 3Q LTE, 5Q Wibro, or Wimax).

The BT/Wi-Fi communication circuit 293 according to various embodiments may be configured to transmit or receive data to or from an external device by using short-range communication (e.g., Bluetooth, Bluetooth low energy (BLE), or Wi-Fi).

The GNSS module 295 according to various embodiments may be a sensor which receives a signal transmitted from a satellite and calculates a location of the electronic device. A global navigation satellite system (GNSS) may refer to a system which provides information on a location, an altitude, or a speed of a ground object by using an artificial satellite. The GNSS module 295 may include, for example, a global positioning system (GPS), a global navigation satellite system (GLONASS), a European satellite navigation system (GALILEO), Beidou, Juntencho, or an Indian regional navigation satellite system (IRNSS).

The C-V2X communication circuit 297 according to various embodiments may be configured to transmit or receive a V2X message via C-V2X communication conforming to the 3GPP standard.

The DSRC communication-based WAVE communication circuit 299 according to various embodiments may be configured to transmit or receive a V2X message via WAVE communication conforming to the IEEE 802.11p and IEEE 1609 standards.

Figure 3:
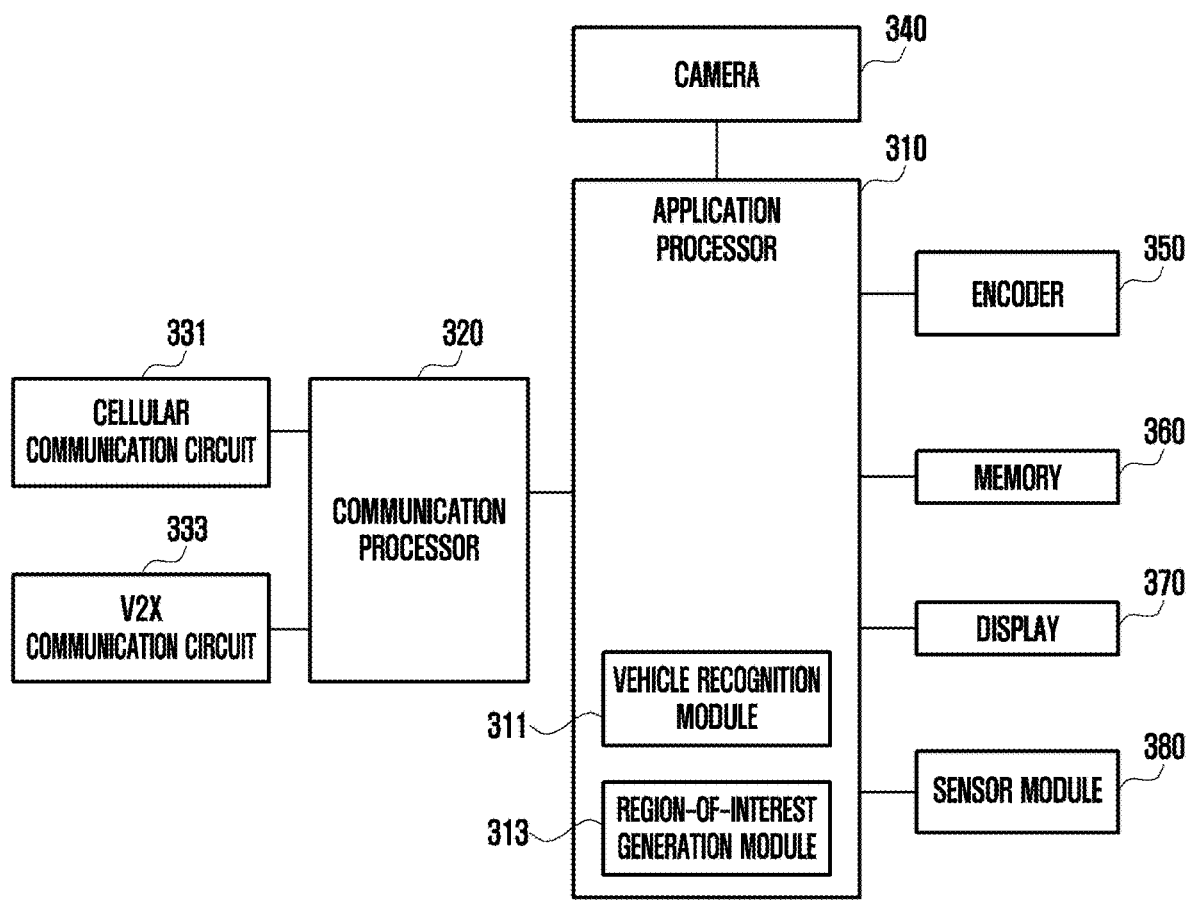
FIG. 3 is a block diagram of an electronic device according to various embodiments.

FIG. 3 is a block diagram of an electronic device according to various embodiments. FIG. 3 is a block diagram illustrating a hardware module and a software module of an electronic device according to various embodiments.

Referring to FIG. 3, the electronic device 201 (e.g., the electronic device 101 of FIG. 1) according to various embodiments may include a control means 310 (e.g., an application processor, the main processor 121 of FIG. 1, the application processor 211 of FIG. 2A, and the application processor 261 of FIG. 2C), a communication control means 320 (e.g., a communication processor, the coprocessor 123 of FIG. 1, and the communication processor 263 of FIG. 2C), a communication means (e.g., a cellular communication circuit 331, the communication module 190 of FIG. 1, the cellular communication circuit 291 of FIG. 2C, a V2X communication circuit 333, and the V2X communication module 210 of FIG. 2A), at least one imaging means 340 (e.g., a camera and the camera module 180 of FIG. 1), an encoder 350, a memory 360 (e.g., the memory 130 of FIG. 1, the memory 240 of FIG. 2A, and the memory 267 of FIG. 2C), a display mean 370 (e.g., a display, the display device 160 of FIG. 1, the display 212 of FIG. 2A, and the display 265 of FIG. 2C), or a sensor module 380 (e.g., the sensor module 176 of FIG. 1). Even when a part of the configurations shown in FIG. 3 is omitted or substituted, there will be no problem in implementing various embodiments disclosed in this document, and even when a part of the elements shown in FIG. 1 and FIGS. 2A to 2C is added, there will be no problem in implementing various embodiments disclosed in this document. The contents overlapping with the contents described in FIGS. 2A to 2C will be omitted.

According to various embodiments, the application processor 310 may control each element of the electronic device 201 and/or perform an operation or data processing related to communication. The application processor 310 and the communication processor 320 according to various embodiments may be implemented as one processor. In various embodiments disclosed in this document, it is assumed that the application processor 310 and the communication processor 320 are implemented as one processor.

The cellular communication circuit 331 according to various embodiments may be configured to perform LTE or 5G communication by using a licensed frequency band of a communication service provider using a cellular network. For example, the application processor 310 may transmit an image to a mobile edge cloud or multi-access edge cloud (MEC) server through the cellular communication circuit 331. The MEC server may be a server which performs a computing/storage/networking function for a specific application by arranging a cloud server at a network edge in order to reduce latency which may occur when an application service is performed through cloud.

The V2X communication circuit 333 according to various embodiments may be configured to transmit or receive at least one V2X message via C-V2X communication or WAVE communication.

The communication processor 320 according to various embodiments may include a V2X information collection module or a V2X information generation module. The modules may be software modules. The V2X information collection module according to various embodiments may collect V2X data by analyzing at least one V2X message received from an external device (e.g., an external vehicle, an infrastructure, or a user terminal) through the V2X communication circuit 333. The V2X information generation module according to various embodiments may generate V2X information including at least one of a speed, a location, a direction, a time, or a vehicle route of the electronic device. The communication processor 320 according to various embodiments may broadcast a V2X message including the generated V2X information to the external device through the V2X communication circuit. In various embodiments disclosed in this document below, it is assumed that the communication processor 320 and the application processor 310 are implemented as one processor.

At least one camera 340 according to various embodiments may capture a still image and a moving image to generate raw data about the captured image. The at least one camera 340 according to various embodiments may be a camera built in the electronic device 201, or a camera which is electrically connected to the electronic device 201 and installed or attached to one side of a vehicle (e.g., the front, rear, or side of the vehicle).

According to various embodiments, the application processor 310 may include a vehicle recognition module 311 and a region-of-interest generation module 313. The modules may be software modules.

The vehicle recognition module 311 according to various embodiments may recognize a vehicle object outside the electronic device 201 by analyzing raw data of an image obtained through the at least one camera 340.

The application processor 310 according to various embodiments may receive at least one V2X message through the V2X communication circuit 333.

The V2X message may include, for example, a basic safety message (BSM) received from an external vehicle via V2V communication, or a road side alert (RSA) received from an infrastructure via V2I communication.

The BSM may include core data, vehicle safety information, special vehicle information, and supplemental vehicle information. The core data may include, for example, at least one of order information, temporary ID, time, location (e.g., latitude, longitude, and altitude) information, accuracy, transmission information, a speed, a direction, a steering angle, 3-axis acceleration, an angular speed, a brake status, or vehicle size information. For example, the vehicle safety information may include at least one of vehicle event information, route information, and exterior light information. For example, the special vehicle information may include at least one of light bar in use information, additional event information, or information on a construction lane. The supplementary vehicle information may include, for example, at least one of information on a vehicle type or a vehicle class.

The RSA may include, for example, order information, RSA type information (e.g., event type information), heading, location (e.g., longitude, latitude, and altitude), unique ID, and environment information. The environment information may include, for example, at least one of temperature, humidity, deceleration standard information, speed limit information, or road width information. According to various embodiments, the infrastructure may transmit an image capturing request parameter to a vehicle capable of capturing an image in order to identify a specific type of an event which has occurred, and control the vehicle to perform image capturing. The image capturing parameter may be included in a reserved region in an RSA message frame.

The control means 310 (e.g., an application processor) according to various embodiments may analyze at least one V2X message and determine whether to capture an image through at least one imaging means 340 (e.g., a camera).

For example, the application processor 310 may analyze at least one received V2X message, so as to determine whether an event occurs. For example, the application processor 310 may receive at least one V2X message broadcasted by an external device (e.g., an external vehicle), and analyze the received V2X message to determine whether an event (e.g., a traffic accident) occurs. For example, the application processor 310 may determine to capture an image in response to the occurrence of a specific event.

The application processor 310 according to various embodiments may determine whether to capture an image, based on the received at least one V2X message.

The application processor 310 according to various embodiments may determine a region of interest, based on the at least one V2X message, in response to the determination to capture the image. For example, the application processor 310 may determine, as the region of interest, a predetermined region including the location where the event has occurred.

The application processor 310 according to various embodiments may obtain an image including the determined region of interest, through at least one camera 340 electrically connected to the electronic device 201. For example, the application processor 310 may select a camera capable of capturing the determined region of interest from among the at least one camera 340, and obtain the image including the determined region of interest by controlling the selected camera.

The application processor 310 according to various embodiments may analyze the obtained image to identify an object included in the obtained image. For example, the application processor 310 may determine a region corresponding to the region of interest by analyzing the obtained image. The application processor 310 may identify an object included in the region corresponding to the region of interest.

The application processor 310 according to various embodiments may match an object identified in the image with the received at least one V2X message.

For example, the application processor 310 may analyze the received at least one V2X message to calculate information on an external device which has transmitted the at least one V2X message. For example, the application processor 310 may calculate at least one piece of information on a location of the external device which has transmitted the at least one V2X message, a distance from the electronic device 201 to the external device, an angle from a movement direction of the electronic device 201 to the external device, a size of the external device, or a type of the external device. The application processor 310 according to various embodiments may store, in a table format in a database, information calculated by analyzing the at least one V2X message.

For example, the application processor 310 may analyze the obtained image to calculate information on an identified object. For example, the application processor 310 may calculate at least one piece of information on a location of the external device which has transmitted the at least one V2X message, a distance from the electronic device 201 to the external device, an angle from a movement direction of the electronic device 201 to the external device, a size of the external device, or a type of the external device. The application processor 310 according to various embodiments may store, in a table format in a database, information calculated by analyzing the image.

The application processor 310 according to various embodiments may compare the information calculated by analyzing the at least one V2X message with the information calculated by analyzing the image, so as to match the identified object in the image with the at least one V2X message.

The application processor 310 according to various embodiments may generate an image with which the at least one V2X message is combined through the encoder 350. For example, the encoder 350 may combine the at least one V2X message with the obtained image and digitally compress the combined image to generate a final image.

The display means 370 (e.g., a display) according to various embodiments may display V2X information matching the identified object and the generated image.

Figure 4:
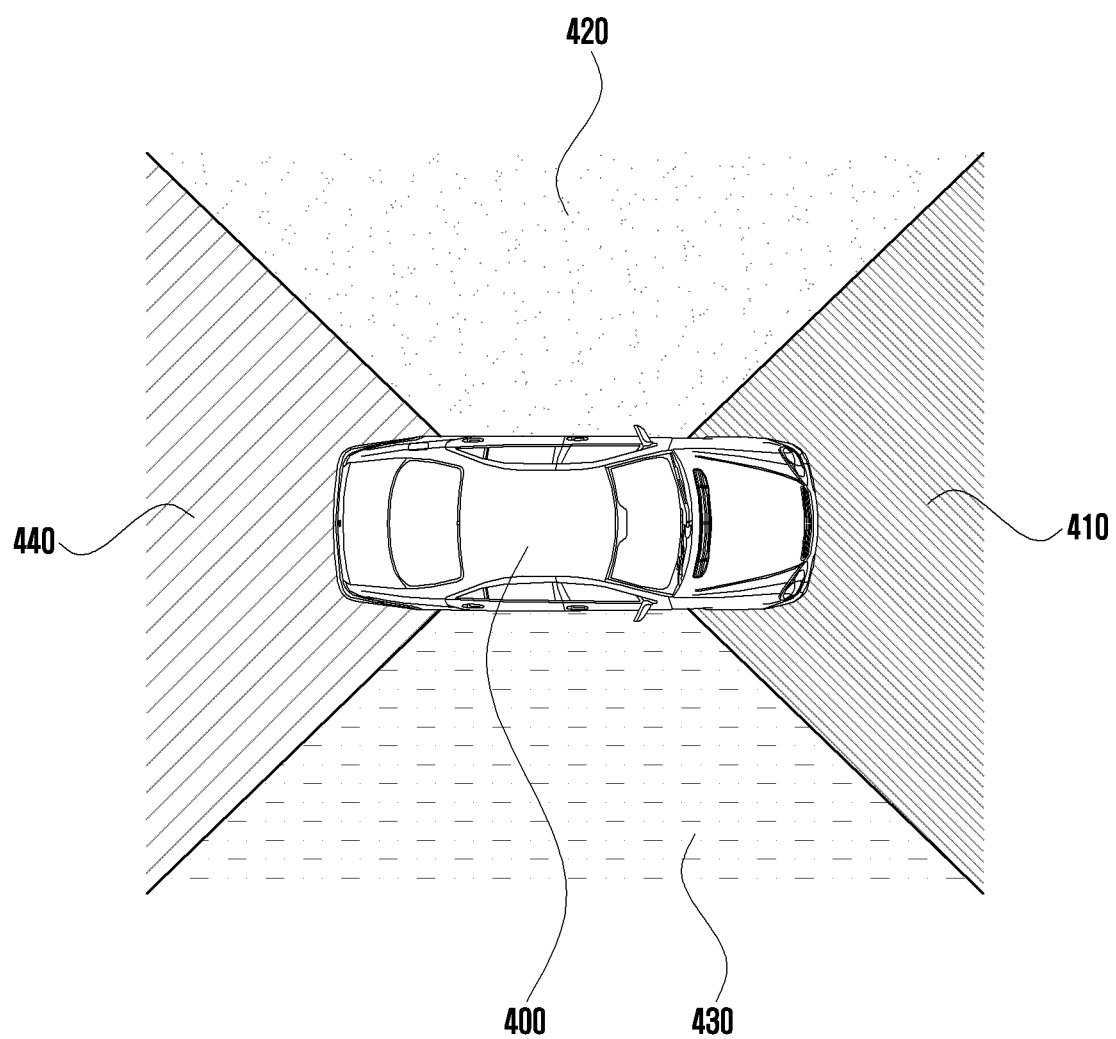
FIG. 4 briefly illustrates an electronic device obtaining an image according to various embodiments.

FIG. 4 briefly illustrates an electronic device obtaining an image according to various embodiments.

Referring to FIG. 4, a vehicle 400 having the electronic device 201 built therein or attached thereto according to various embodiments may obtain an image through at least one camera 340 electrically connected to the electronic device 201. The at least one camera 340 may include a front camera, a rear camera, or a side camera. According to various embodiments, the vehicle 400 may include a front sensor, a rear sensor, or a side sensor in order to recognize a surrounding object or environment.

When the application processor 310 of the electronic device 201 according to various embodiments determines that an event has occurred on a front side 410 in a movement direction (a travel direction) of the vehicle 400, the application processor may obtain an image of the front side 410 through the front camera, and when the application processor determines that an event has occurred on a right side 430 in the movement direction of the vehicle 400, the application processor may obtain an image of the right side 430 through a right side camera.

Figure 5:
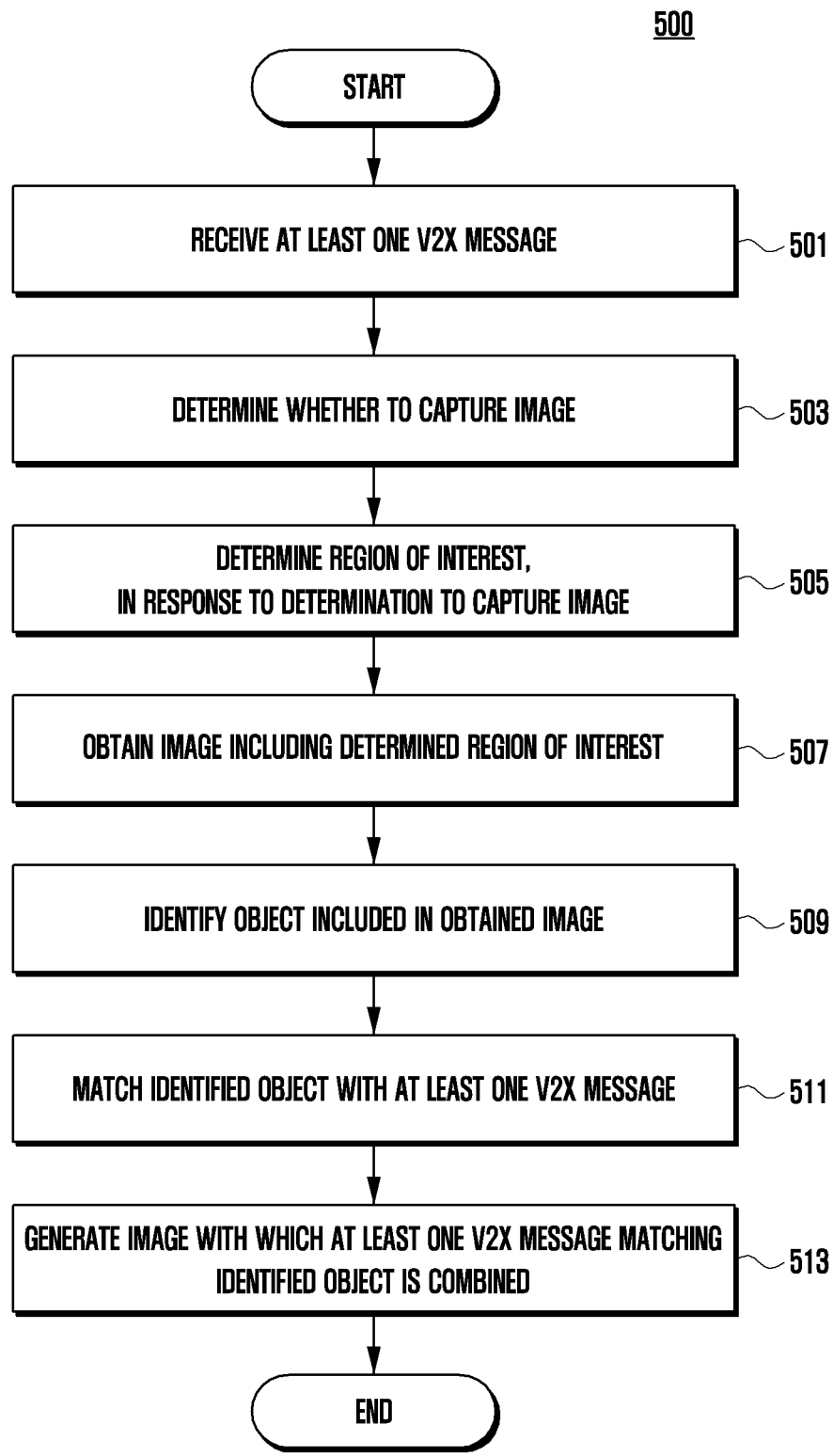
FIG. 5 is a flowchart illustrating an operation of an electronic device according to various embodiments.

FIG. 5 is a flowchart illustrating an operation of an electronic device according to various embodiments.

Referring to a flowchart 500 of an operation, in operation 501, the processor 310 according to various embodiments may receive at least one V2X message through the V2X communication circuit 333.

In operation 503, the processor 310 according to various embodiments may determine whether to capture an image, based on the at least one V2X message. For example, the processor 310 may analyze the at least one V2X message and determine whether to capture an image according to whether an event preconfigured as requiring image capturing has occurred. A specific processor 310 for determining whether to capture an image will be described in detail with reference to FIG. 7.

In operation 505, the processor 310 according to various embodiments may configure a region of interest in response to the determination to capture the image. For example, when the processor 310 analyzes the at least one V2X message to determine that an event has occurred, the processor 310 may determine, as the region of interest, a predetermined region including the location where the event has occurred.

In operation 507, the processor 310 according to various embodiments may obtain an image including the determined region of interest, through at least one camera 340 electrically connected to the electronic device 201. For example, the processor 310 may select a camera capable of capturing the region of interest from among the at least one camera 340 electrically connected to the electronic device 201, and control the selected camera to obtain the image including the determined region of interest.

In operation 509, the processor 310 according to various embodiments may analyze the obtained image to identify an object included in the obtained image. For example, the processor 310 may determine (or extract) a region corresponding to the region of interest by analyzing the obtained image, and identify an object included in the region corresponding to the region of interest. When a plurality of objects are included in the determined region, each of the plurality of objects may be identified.

In operation 511, the processor 310 according to various embodiments may match the identified object in the image with the at least one V2X message. For example, the processor 310 may analyze the at least one V2X message to calculate information on an external device which has transmitted the at least one V2X message. For example, the processor 310 may analyze the image to calculate information on the identified object. The processor 310 may compare information calculated by analyzing the at least one V2X message with information calculated by analyzing the image, and attempt to perform matching. When it is determined that the external device which has transmitted the at least one V2X message and the identified object in the image are the same object as a result of the comparison, the processor 310 may match the at least one V2X message with the identified object.

In operation 513, the processor 310 according to various embodiments may generate an image with which the at least one V2X message matching the identified object is combined. For example, the processor 310 may mark V2X information matching the identified object and the type of the occurred event on a timestamp of the image, and generate an image with which the identified object and the at least one V2X message are combined.

Figure 6:
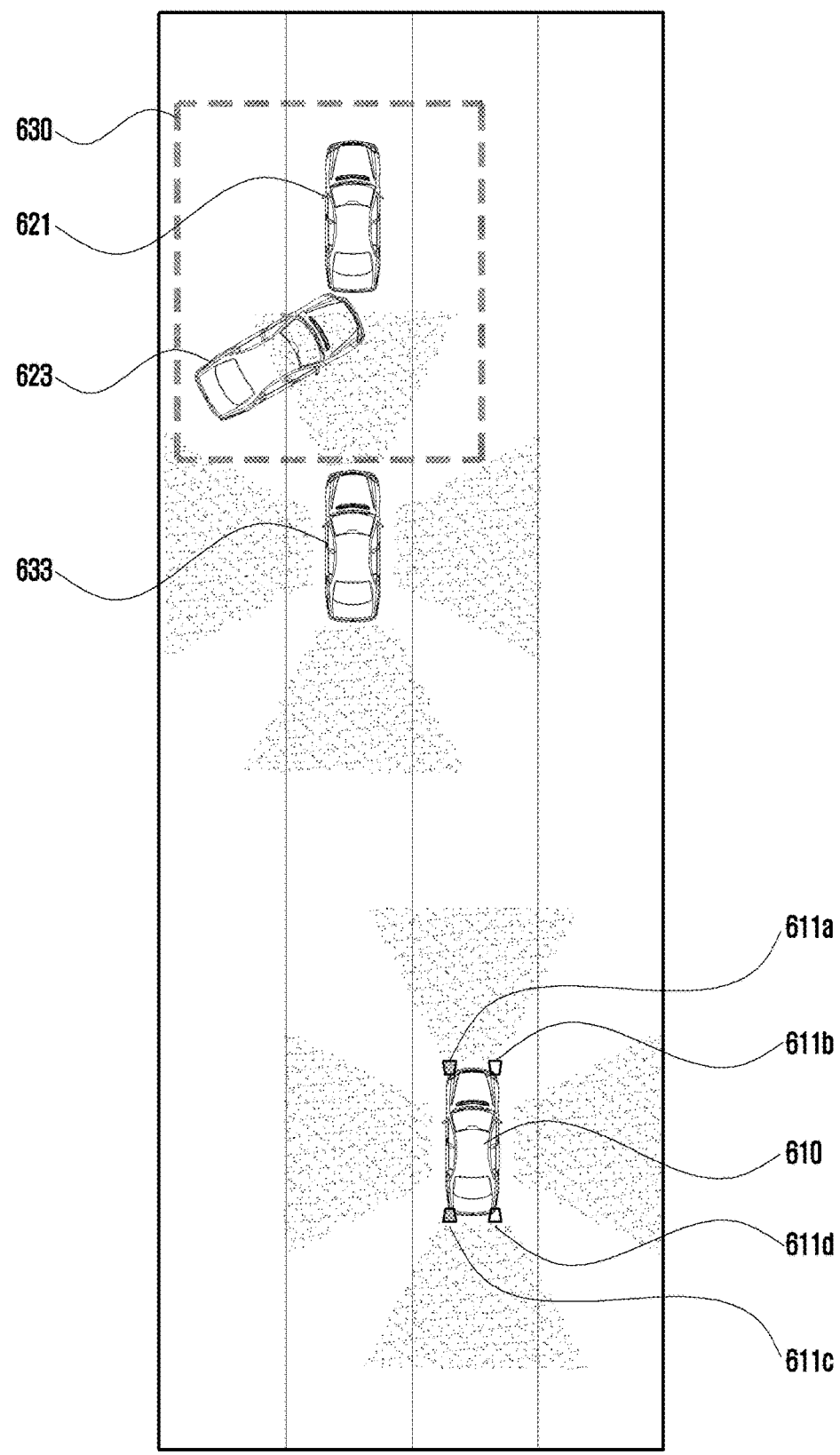
FIG. 6 illustrates a method for determining whether to capture an image and extracting a region of interest by an electronic device according to various embodiments.

FIG. 6 illustrates a method for determining whether to capture an image and extracting a region of interest by an electronic device according to various embodiments.

Referring to FIG. 6, when a vehicle 610 having the electronic device 201 built therein or attached thereto drives on a road, the vehicle may receive at least one V2X message from external vehicles 621, 623, and 633 which support V2X communication. For example, the electronic device 201 of the vehicle may receive the at least one V2X message from a first external vehicle 621, a second external vehicle 623, and a third external vehicle 633. For example, the electronic device 201 may receive a V2X message including at least one V2X information of location information (e.g., GPS information), temporary ID information, event information, or lane information from each of the first external vehicle 621, the second external vehicle 623, and the third external vehicle 633.

The processor 310 of the electronic device 201 according to various embodiments may determine whether to capture an image, based on the received at least one V2X message. For example, the processor 310 may analyze the received at least one V2X message to determine whether an event preconfigured as requiring image capturing has occurred. For example, as a result of the analyzing of the received at least one V2X message, the processor 310 may determine that the first external vehicle 621 and the second external vehicle 623 collide with each other and thus a collision accident event has occurred. When the collision accident event is an event requiring image capturing, the processor 310 may determine to capture an image. For example, as a result of the analyzing of the received at least one V2X message, the processor 310 may identify that a sudden deceleration event has occurred in the third external vehicle 633. When the sudden deceleration event is an event which does not require image capturing, the processor 310 may determine not to capture an image.

The processor 310 according to various embodiments may configure a region of interest 630 in response to the determination to capture the image. For example, when the processor 310 may identify that the collision accident event has occurred and determine to capture the image, the processor may determine, as the region of interest 630, a region of a predetermined size including a location where the collision accident event has occurred.

The processor 310 according to various embodiments may obtain an image including the determined region of interest 630, through at least one imaging means (e.g., cameras 611a, 611b, 611c, and 611d, and the camera 340 of FIG. 3) electrically connected to the electronic device 201. The processor 310 may determine a camera to start image capturing from among the at least one camera 611a, 611b, 611c, and 611d in order to obtain the image including the determined the region of interest 630. For example, it is assumed that two cameras 611a and 611b are installed at the front of a vehicle having the electronic device 201 installed therein or attached thereto, and two cameras 611c and 611d are installed at the rear of the vehicle. As a result of the analyzing of the at least one V2X message, the processor 310 may identify that a location of the determined region of interest 630 is in front of the left side of a movement direction of the electronic device 201. In this case, the processor 310 may select, as a camera to start image capturing, a first front camera 611a installed on the left side among the two front cameras 611a and 611b of the vehicle and a first rear camera 611c installed on the left side among the two rear cameras 611c and 611d. The processor 310 according to various embodiments may obtain the image including the region of interest 630 through the first front camera 611a and the first rear camera 611c.

Figure 7:
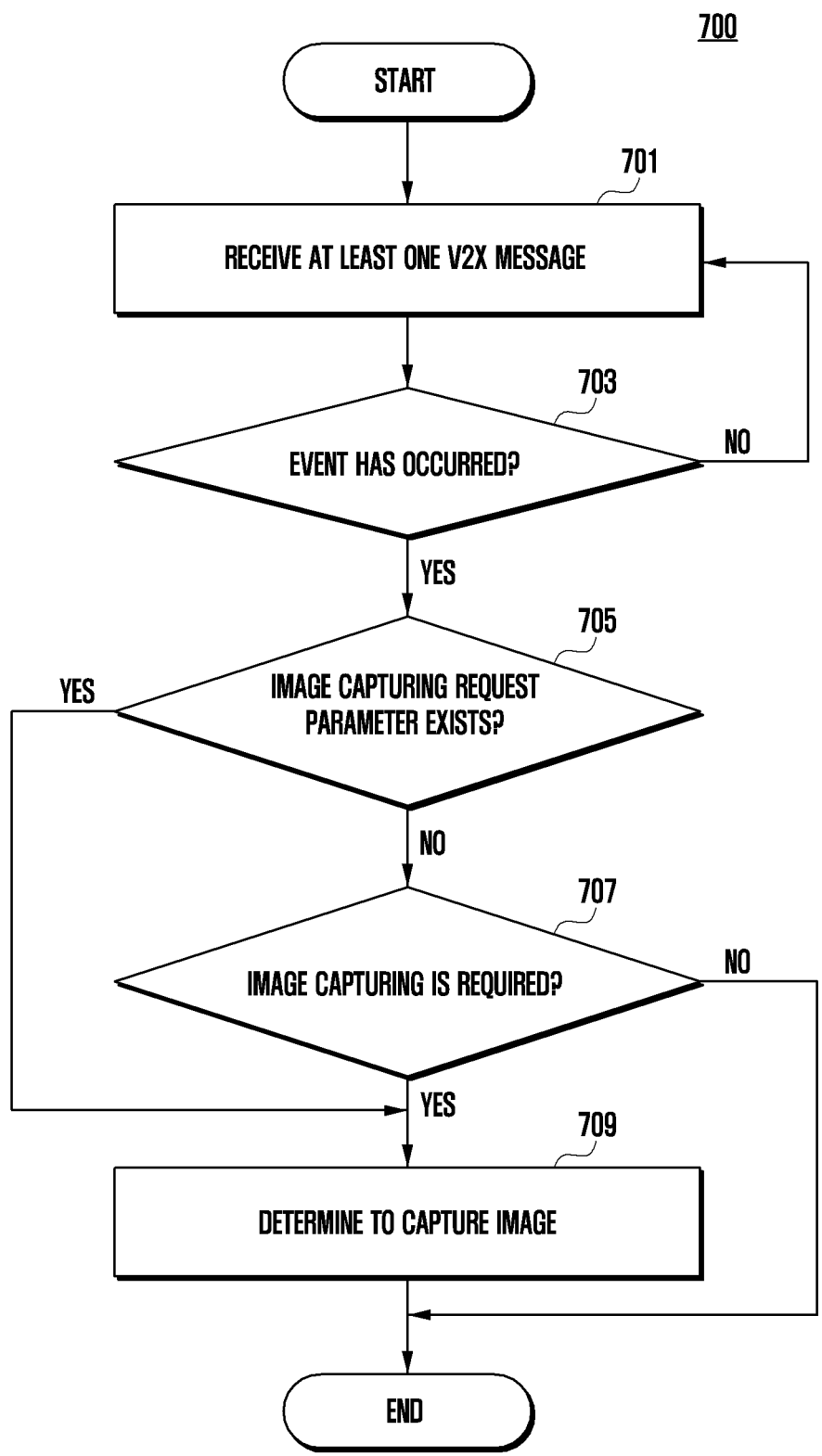
FIG. 7 is a flowchart illustrating an operation of an electronic device according to various embodiments.

FIG. 7 is a flowchart illustrating an operation of an electronic device according to various embodiments. Specifically, FIG. 7 is a flowchart of an operation relating to a method for determining whether to capture an image.

Referring to a flowchart 700 of an operation, in operation 701, the processor 310 according to various embodiments may receive at least one V2X message through the V2X communication circuit 333. The V2X message may include, for example, a basic safety message (BSM) or a road side alert (RSA).

In operation 703, the processor 310 according to various embodiments may determine whether an event occurs, based on the at least one V2X message. For example, the processor 310 may analyze the at least one V2X message to determine whether a preconfigured event has occurred. When the preconfigured event has not occurred, the processor 310 may return to operation 701 and receive the at least one V2X message. When the preconfigured event has occurred, the processor 310 may proceed to operation 705 to determine whether an image capturing request parameter exists in the received at least one V2X message.

For example, when the received V2X message is the BSM, the processor 310 may determine whether an event occurs, through vehicle safety information of the BSM, and identify the type of the occurred event. The processor 310 may determine whether to capture an image, based on the type of the occurred event. For example, the processor 310 may determine to capture an image when the occurred event is an event preconfigured as requiring image capturing.

Table 1 below shows an example of the type of the event which requires image capturing. According to various embodiments, an event included below includes an image capturing request parameter, and the processor 310 may determine to perform image capturing in response to occurrence of the event including the image capturing request parameter. According to various embodiments, a weight for determining whether to capture an image is preconfigured according to the priority of the event, and the processor 310 may determine whether to capture an image according to the weight value.

Items shown in Table 1 below are exemplary.

TABLE 1

| Turns | Event types |
|---|---|
| 1 | ABS |
| 2 | Hard Braking |
| 3 | Airbag |
| 4 | Traction Control loss |
| 5 | Stability Control activated |
| 6 | Flat Tire |
| 7 | Disabled Vehicle |
| 8 | Roadwork |

When the received V2X message is the RSA, the RSA may include information determined through processing in the infrastructure. For example, the RSA may filter and include information on an event on a road, based on a message transmitted from each vehicle and information collected through a sensor installed on the road.

The processor 310 may determine whether an event has occurred, through RSA type information of the RSA and identify the type of the occurred event.

Table 2 below shows an example of the type of an event which requires image capturing. According to various embodiments, when an event included in Table 2 below occurs, the processor 310 may determine to perform image capturing. According to various embodiments, a weight for determining whether to capture an image is preconfigured according to the priority of the event, and the processor 310 may determine whether to capture an image according to the priority of the event. According to various embodiments, when an image capturing request parameter exists in a reserve region of the RSA, the processor 310 may determine to perform image capturing.

Items shown in Table 2 below are exemplary.

TABLE 2

| Turns | Event types |
|---|---|
| 1 | Obstacle |
| 2 | Traffic jam |
| 3 | Accident |
| 4 | Emergency vehicle |
| 5 | Stationary vehicle |
| 6 | Obstacle |
| 7 | Pedestrian |
| 8 | Animal |
| 9 | Driving against traffic |
| 10 | Slow-moving vehicle |

According to various embodiments, when the image capturing request parameter exists in the received at least one V2X message, the processor 310 may proceed to operation 709 and determine to capture an image.

According to various embodiments, when the image capturing request parameter does not exist in the received at least one V2X message, the processor 310 may proceed to operation 707 and determine whether image capturing is required.

For example, an event which is not defined in the BSM or RSA (e.g., a sensor failure event) may occur. In this case, the processor 310 may schedule BSMs of two or more vehicles, and refer to environment information to determine whether image capturing is required.

For example, the processor 310 may identify environment information of the RSA, quantify a weight for the occurred event and a weight for the environment information by using a preconfigured weight for each piece of information, and determine whether to capture an image, based on whether the quantified weight value exceeds a threshold value for image capturing.

Table 3 below shows information on environment variables. According to various embodiments, a weight for determining whether to capture an image is preconfigured according to the priority of environment information, and the processor 310 may determine whether to capture an image according to the weight value.

TABLE 3

| Turns | Environment variables |
|---|---|
| 1 | Area of frequent accidents |
| 2 | Time of frequent accidents |
| 3 | Water film |
| 4 | Snowdrifts |
| 5 | Freezing |
| 6 | Inundation |
| 7 | Snowstorm |
| 8 | Snowfall |
| 9 | Hail |
| 10 | Rainfall |
| 11 | Strong wind |
| 12 | Temperature-humidity |
| 13 | Fog |

When the processor 310 according to various embodiments determines that image capturing is required, the processor may proceed to operation 709 and determine to capture an image.

Figure 8:
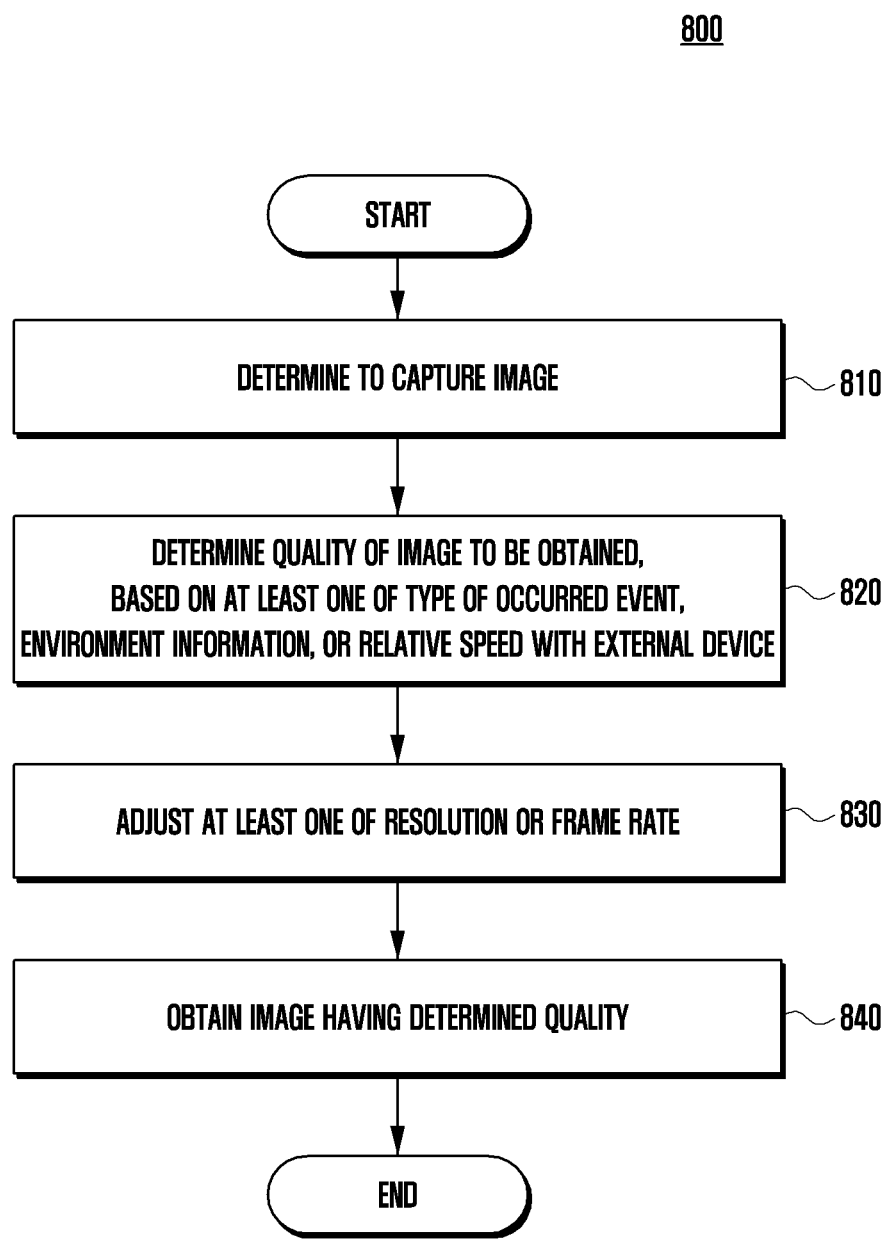
FIG. 8 is a flowchart illustrating an operation of an electronic device according to various embodiments.

FIG. 8 is a flowchart illustrating an operation of an electronic device according to various embodiments. Specifically, FIG. 8 illustrates a method for determining a quality of an image to be obtained after determining to capture an image.

Referring to a flowchart 800 of an operation, it is assumed that, in operation 810, the processor 310 according to various embodiments may determine whether to capture an image, based on at least one V2X message.

In operation 820, the processor 310 according to various embodiments may determine a quality of an image to be obtained, based on the at least one V2X message. For example, the processor 310 may analyze the at least one V2X message to identify one of a type of an occurred event, environment information, or a relative speed with an external device. The processor 310 may determine the quality of the image to be obtained, based on at least one of the type of the occurred event, the environment information, or the relative speed with the external device.

For example, an image finally generated by the electronic device 201 may be transmitted to an infrastructure (e.g., a roadside unit (RSU)) via V2I communication. When high-quality images are generated and collectively transmitted to the infrastructure, bandwidth and traffic problems may occur. Alternatively, when low-quality images are generated and collectively transmitted to the infrastructure, it may be difficult to specifically analyze an occurred event. The processor 310 according to various embodiments may differentially configure the quality of the image to be obtained, based on the at least one V2X message.

According to various embodiments, in operation 830, the processor 310 may adjust at least one of a resolution or a frame rate of the image to be obtained, in order to obtain an image having the determined quality. For example, the processor 310 may control to adjust at least one of a resolution or a frame rate of at least one camera 340 electrically connected to the electronic device 201.

In operation 840, the processor 310 according to various embodiments may obtain the image having the determined quality from the at least one camera 340.

The processor 310 according to various embodiments may transmit, to a server (e.g., a MEC server), an image, of which at least one of a resolution or a frame rate is adjusted. The processor 310 according to various embodiments may transmit an original quality image to the server when receiving a request to transmit an original image from the server.

Figure 9:
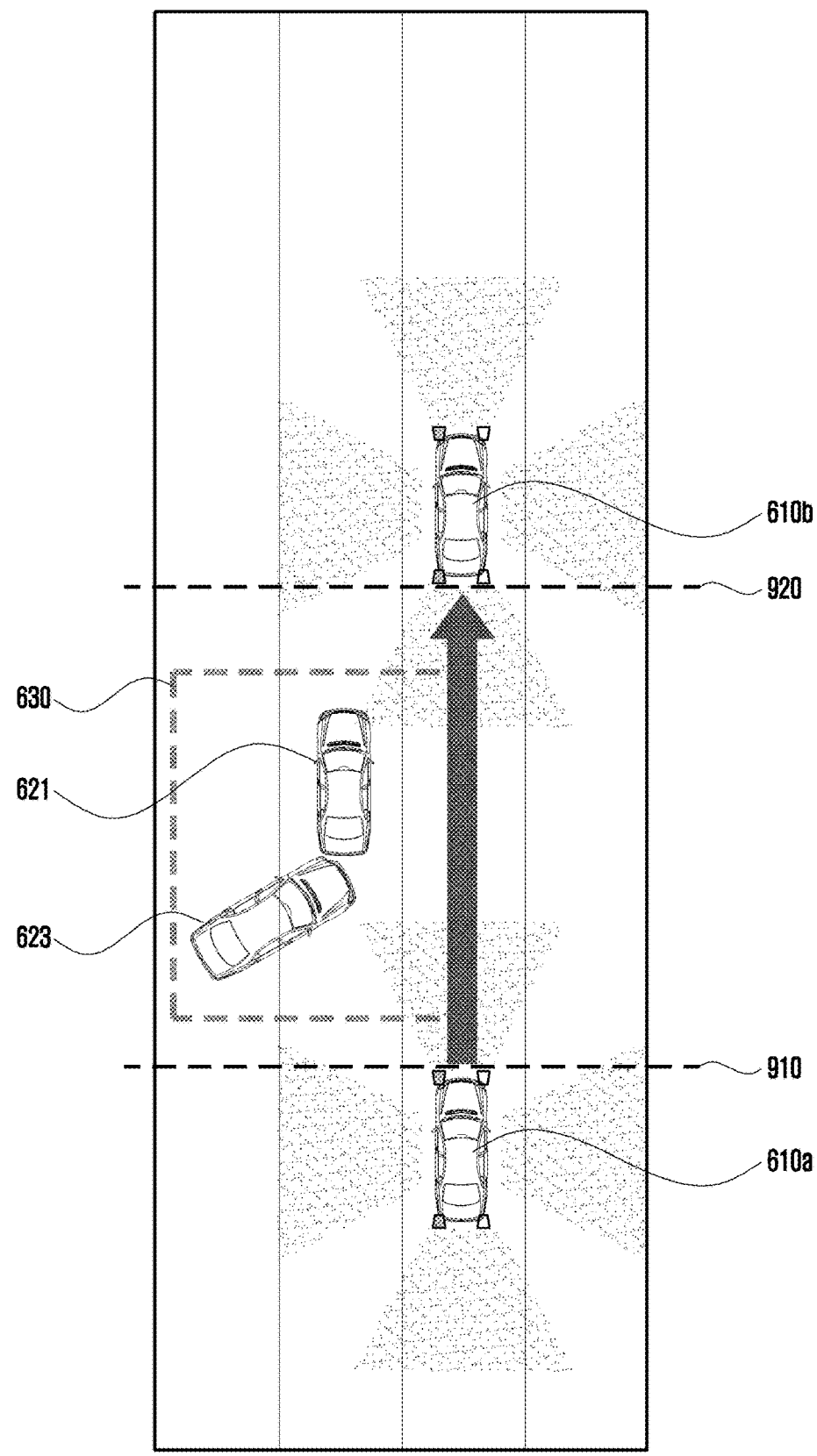
FIG. 9 illustrates an image capturing start time point and an image capturing end time point according to various embodiments.

FIG. 9 illustrates an image capturing start time point and an image capturing end time point according to various embodiments.

The processor 310 of the electronic device 201 according to various embodiments may determine an image capturing start time and an image capturing end time, based on at least one V2X message.

The processor 310 of the electronic device 201 according to various embodiments may analyze the at least one received V2X message to calculate a distance from a location of the electronic device 201 to a location of an external device which has transmitted the at least one V2X message and an angle from a movement direction of the electronic device to the location of the external device.

Referring to FIG. 9, it is assumed that the vehicle 610 having the electronic device 201 installed therein or attached thereto proceeds in the direction of an arrow and moves from a first location 610a to a second location 610b.

The processor 310 of the electronic device 201 may receive at least one V2X message from a first external vehicle 621 and a second external vehicle 623, analyze the received at least one V2X message to determine that a vehicle collision event has occurred, and determine to perform image capturing in response to the occurrence of the vehicle collision event. The processor 310 may determine, as an region of interest 630, a predetermined region including locations of the first external vehicle 621 and the second external vehicle 623 in which the vehicle collision event has occurred.

In this case, the processor 310 may identify the locations of the first external vehicle 621 and the second external vehicle 623 through the received at least one V2X message. The processor 310 may identify a location, a movement speed, and a movement direction of the vehicle 610 having the electronic device 201 installed therein or attached thereto, through V2X information of the vehicle 610. For example, the location of the vehicle 610 may be identified through GPS information of the vehicle 610 included in the V2X message, and the movement direction of the vehicle 610 may be identified through heading information of the vehicle 610 included in the V2X message.

The processor 310 may calculate a location from the location of the vehicle 610 to the first external vehicle 621 and the second external vehicle 623 by using the identified information. The processor 310 may calculate an angle from the movement direction of the vehicle 610 (the arrow direction in FIG. 9) to the first external vehicle 621 and the second external vehicle 623 by using the identified information.

The processor 310 according to various embodiments may control at least one camera 340 to start capturing an image for the determined region of interest 630 when the calculated distance and angle correspond to a preconfigured range.

For example, when a distance between the vehicle 610 and each of the first external vehicle 621 and the second external vehicle 623 is within 10 m, and an angle from the movement direction of the vehicle 610 to the first external vehicle 621 and the second external vehicle 623 is 45 degrees or more and less than 135 degrees, the processor 310 may configure a corresponding section as a section in which image capturing is performed. The section in which the image capturing is performed may be configured based on the type of an event or environment information around the vehicle. In FIG. 9, the processor 310 may determine a line 910 as a starting point of the image capturing.

When the vehicle 610 is out of the preconfigured range, the processor 310 according to various embodiments may control at least one camera 340 to end the image capturing. In FIG. 9, the processor 310 may determine a line 920 as an ending point of the image capturing.

The processor 310 according to various embodiments may end the image capturing in response to the elapse of a preconfigured time from a time when the image capturing is started. For example, when a vehicle in which an event has occurred is moving in the same direction at a movement speed similar to a vehicle in which the electronic device 201 is installed, since the vehicle in which the event has occurred may not escape a preconfigured distance and angle range, the processor 310 may end the image capturing when an image capturing time exceeds the preconfigured time.

Figure 10:
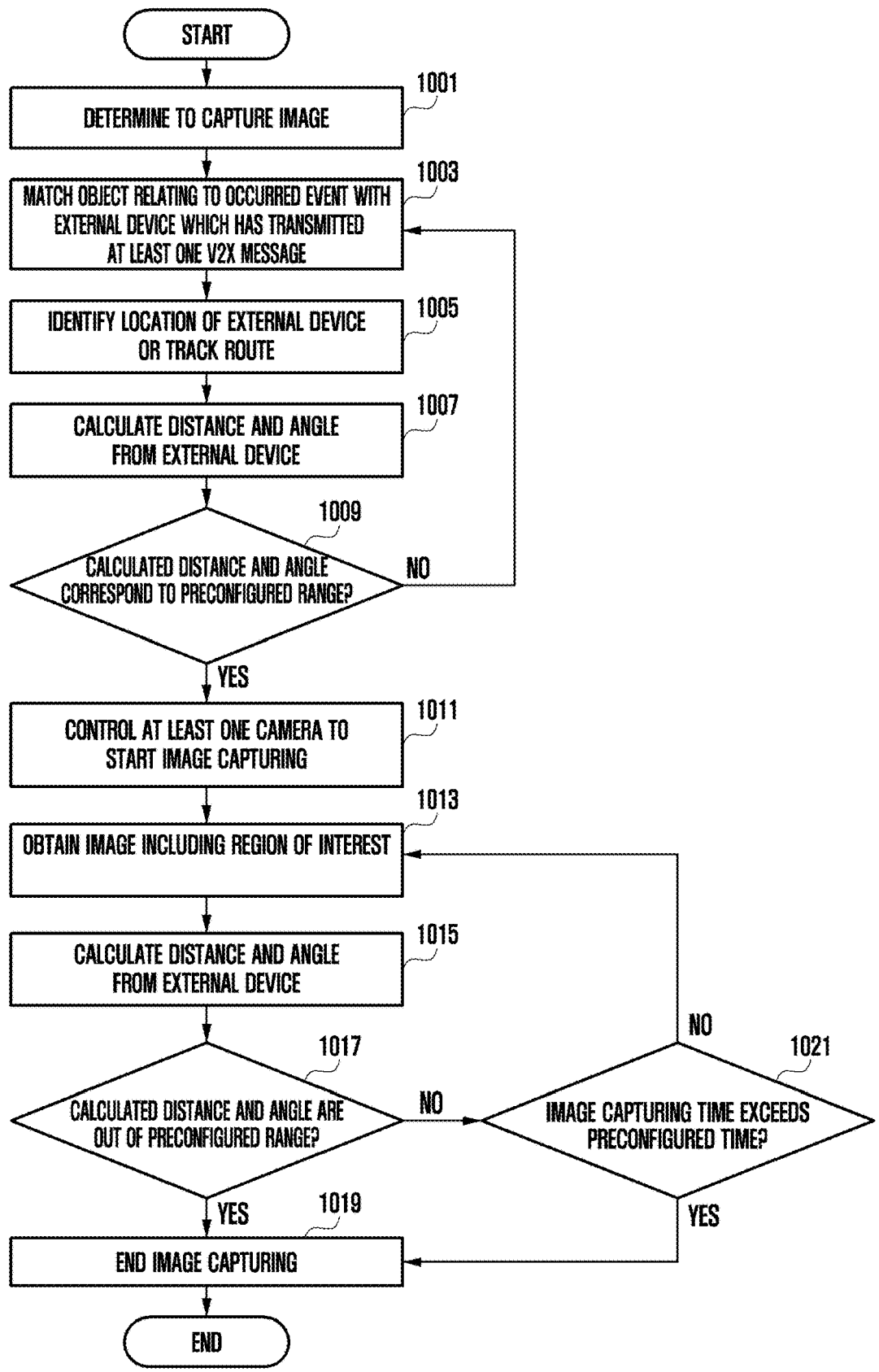
FIG. 10 is a flowchart illustrating an operation of an electronic device according to various embodiments.

FIG. 10 is a flowchart illustrating an operation of an electronic device according to various embodiments. Specifically, FIG. 10 is a flowchart illustrating an operation relating to a method for determining an image capturing start time point and an image capturing end time point by an electronic device according to various embodiments.

Referring to a flowchart 1000 of an operation, in operation 1001, the processor 310 according to various embodiments may determine to capture an image, based on at least one V2X message. The processor 310 may determine whether to capture an image by analyzing the at least one V2X message to determine whether a preconfigured event has occurred.

In operation 1003, the processor 310 according to various embodiments may match an object relating to the occurred event with an external device which has transmitted the at least one V2X message. For example, the processor 310 may identify the external device by verifying temporary ID information included in the at least one V2X message, and data-match a message generated in the same external device, based on the temporary ID information and order information included in the at least one V2X message. For example, the processor may identify a corresponding object through a temporary ID of the object relating to the occurred event, and data-match a message generated in the same object through an MSG ID and an MSG count of the V2X message.

In operation 1005, when temporary ID information is changed, the processor 310 according to various embodiments may track a location and a movement route of the external device through movement route history information of an external vehicle.

In operation 1007, the processor 310 according to various embodiments may calculate a distance and an angle from the external device, based on the at least one V2X message. The processor 310 may analyze the at least one V2X message to calculate a distance from a location of the electronic device 201 to the external device and an angle from a movement direction of the electronic device 201 to the external device.

In operation 1009, the processor 310 according to various embodiments may determine whether the calculated distance and angle correspond to a preconfigured range to perform image capturing. The processor 310 may determine a range in which image capturing is to be performed, based on the type of the occurred event or environment information around the electronic device 201.

According to various embodiments, when the calculated distance and angle do not correspond to the preconfigured range, the processor may proceed to operation 1003 without starting image capturing.

According to various embodiments, when the calculated distance and angle correspond to the preconfigured range, the processor may proceed to operation 1011 and control at least one camera 340 electrically connected to the electronic device 201, so as to start image capturing.

In operation 1013, the processor 310 according to various embodiments may obtain an image including a determined region of interest.

In operation 1015, the processor 310 according to various embodiments may calculate a distance and an angle from the external device, based on the at least one V2X message. The processor 310 may periodically (or continuously) analyze the at least one V2X message to periodically calculate a distance and an angle from the external device.

In operation 1017, the processor 310 according to various embodiments may determine whether the calculated distance and angle are out of the preconfigured range.

According to various embodiments, when the calculated distance and angle are out of the preconfigured range, the processor 310 may proceed to operation 1019, and control at least one camera 340 to end the image capturing.

According to various embodiments, when the calculated distance and angle are not out of the preconfigured range, the processor 310 may proceed to operation 1021 and determine whether an image capturing time exceeds a preconfigured time. The processor 310 may determine whether the preconfigured time has elapsed from the start of the image capturing.

When the image capturing time does not exceed the preconfigured time, the processor may return to operation 1013 to obtain an image.

When the image capturing time exceeds the preconfigured time, the processor 310 may proceed to operation 1019 to end the image capturing.

Figure 11:
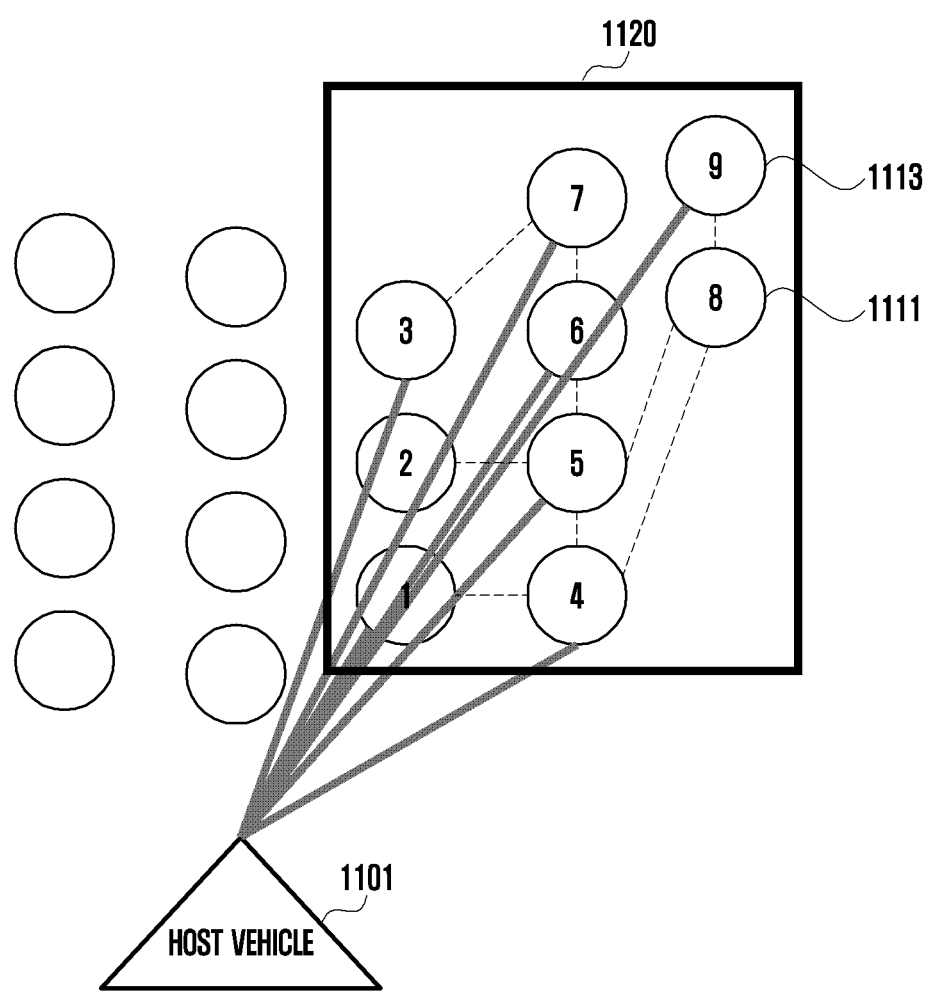
FIG. 11 illustrates a method for analyzing at least one V2X message to calculate information on an external device according to various embodiments.
Figure 12:
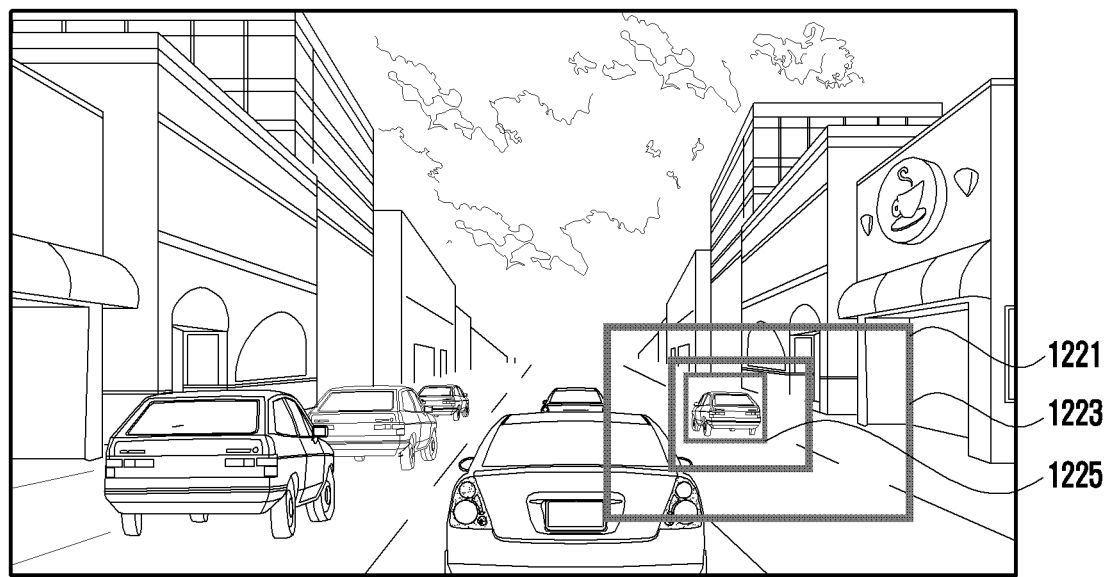
FIG. 12 illustrates a method for analyzing an image to calculate information on an identified object according to various embodiments.

FIG. 11 illustrates a method for analyzing at least one V2X message to calculate information on an external device according to various embodiments. FIG. 12 illustrates a method for analyzing an image to calculate information on an identified object according to various embodiments.

Referring to FIG. 11, the processor 310 according to various embodiments may analyze at least one V2X message to calculate information on an external device. For example, the processor 310 may calculate information on an external device which has transmitted the at least one V2X message. The processor 310 according to various embodiments may calculate information on each of a plurality of external devices and store the calculated information in a table format. For example, the processor 310 may determine a region of interest 1120, based on the at least one V2X message. The processor 310 may analyze the at least one V2X message to calculate information on the external device included in the region of interest. For example, the processor may calculate information on a first external device 1111 and a second external device 1113 in the region of interest 1120.

The processor 310 according to various embodiments may generate V2X information including at least one of a location, a speed, a movement direction, a time, route information, a vehicle type, or a vehicle size of a vehicle 1101 having the electronic device 201 installed therein or attached thereto.

The processor 310 according to various embodiments may receive at least one V2X message through the V2X communication circuit 333. For example, the processor 310 may analyze the received at least one V2X message and calculate V2X information including at least one of a location, a speed, a movement direction, a time, route information, a vehicle type, or a vehicle size of an external device.

The processor 310 according to various embodiments may compare location information of the electronic device 201 with location information of the external device to calculate a distance from the electronic device 201 to the external device. The processor 310 may calculate a relative distance from the electronic device 201 to the external device in real time. For example, the processor 310 may compare a GPS value of the electronic device 201 with a GPS value of the external device, the GPS values being included in the V2X message, so as to calculate a relative distance between the electronic device and the external device.

The processor 310 according to various embodiments may compare movement location information of the electronic device 201 with movement location information of the external device to calculate an angle from a movement direction of the electronic device 201 to the external device. For example, the processor 310 may compare a heading value of the electronic device 201 with a heading value of the external device, the heading values being included in the V2X message, so as to calculate an angle between a front direction of the electronic device 201 and a front direction of the external device.

The processor 310 according to various embodiments may determine the region of interest 1120 by analyzing the at least one V2X message, and calculate a distance from a location of the electronic device 201 to the external device and an angle from a movement direction of the electronic device 201 to the external device, with respect to external devices included in the determined region of interest 1120.

When a plurality of external devices exist, the processor 310 according to various embodiments may calculate, with respect to each of the plurality of external devices, a distance from a location of the electronic device 201 to the external device and an angle from a movement direction of the electronic device 201 to the external device.

The processor 310 according to various embodiments may store, in a table format in a database, information on a distance from the electronic device 201 for each of the plurality of external devices, information on an angle from a movement direction of the electronic device 201, location information, vehicle type information, or vehicle size information.

For example, it is assumed that nine external devices are included in the region of interest 1120 of FIG. 11. In this case, the processor 310 may calculate information on a relative distance from the electronic device 201 and a relative angle from a movement direction of the electronic device 201 with respect to each of the nine external devices. For example, the processor 310 may store, in a table format in a database, distance information, angle information, location information, vehicle type information, or vehicle size information calculated for each of the nine external devices.

Referring to FIG. 12, the processor 310 according to various embodiments may obtain an image through at least one camera 340 electrically connected to the electronic device 201. For example, the processor 310 may obtain primitive image data including the determined region of interest, from the at least one camera 340.

The processor 310 according to various embodiments may analyze the image to determine regions 1221, 1223, and 1225 corresponding to the region of interest. The processor 310 may, for example, analyze the image and analyze the at least one V2X message in the image, so as to extract the regions 1221, 1223, and 1225 corresponding to the determined region of interest. For example, the processor 310 may determine a region of a predetermined size including a location where an event occurs in the image, as the regions 1221, 1223, and 1225 corresponding to the determined region of interest. The size or number of the regions 1221, 1223, and 1225 corresponding to the region of interest according to various embodiments may be variable. For example, the size of the regions 1221, 1223, and 1225 corresponding to the region of interest may be inversely proportional to the reliability (or accuracy), and may be proportional to an operation processing time. For example, an operation of calculating information on an object identified by identifying an object included in region 1 1221 may take a longer time to process than an operation of identifying an object included in region 3 1225 and calculating information on the identified object. The accuracy that the object included in the region 1 1221 matches the external device which has transmitted at least one V2X message may be higher than the accuracy that the object included in the region 3 1225 matches the external device which has transmitted the at least one V2X message. The regions 1221, 1223, and 1225 corresponding to the region of interest are illustrated in a rectangular shape having x-coordinate and y-coordinate values on the drawing, but may be determined in various shapes other than a rectangular shape.

The processor 310 according to various embodiments may analyze the image to identify an object included in the determined region. When the processor does not analyze all objects included in the entire image, but analyzes only the object included in the determined region, the amount of operation of the processor 310 may be significantly reduced, and thus a matching speed of matching the at least one V2X message and the identified object in the image can be improved.

The processor 310 according to various embodiments may calculate information on the identified object. For example, the processor 310 may analyze the image to calculate a vehicle size (e.g., a height, a horizontal length, a vertical length of a vehicle) or a vehicle type (e.g., a car and a bus) of the identified object from frame data. For example, the processor 310 may analyze the image to calculate a relative distance between the electronic device 201 and the identified object or a relative angle from a movement direction of the electronic device 201 to the identified object.

When a plurality of objects are included in the determined region, the processor 310 according to various embodiments may identify each of the plurality of objects and calculate information on each of the plurality of objects. For example, the processor 310 may store information on at least one of an angle from the electronic device 201, a relative distance, or a vehicle type, with respect to each of the plurality of objects in the determined region. The processor 310 may calculate and store a relative distance between the plurality of objects.

For example, it is assumed that three objects (a first external vehicle, a second external vehicle, and a third external vehicle) are included in the determined region. The processor 310 may analyze the image, and calculate and store information on each of the first external vehicle, the second external vehicle, and the third external vehicle. For example, the information on the first external vehicle may calculate an angle between the electronic device 201 and the first external vehicle, a size of the first external vehicle, a type of the first external vehicle, a relative distance from the electronic device 201 to the first external vehicle, a relative distance from the second external vehicle to the first external vehicle, and a relative distance from the third external vehicle to the first external vehicle. Similarly, the processor 310 may calculate and store information on the second external vehicle and information on the third external vehicle.

The processor 310 according to various embodiments may store, in a table format in a database, information on the identified object obtained by analyzing the image. According to various embodiments, the information calculated by analyzing the image is a relative value rather than an absolute value, and may be stored by applying a weight to minimize an error with an actual value.

Figure 13:
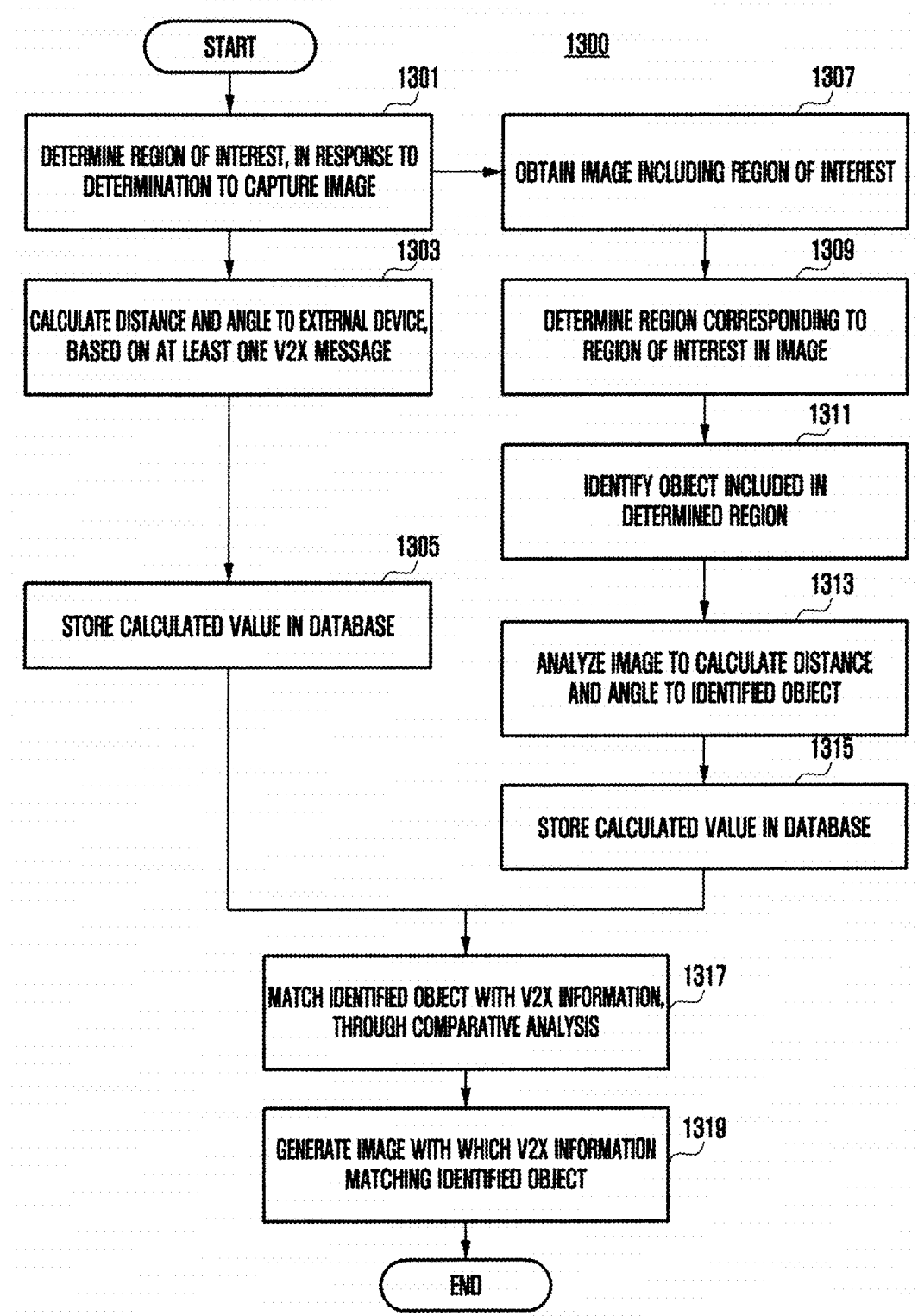
FIG. 13 is a flowchart illustrating an operation of an electronic device according to various embodiments.

FIG. 13 is a flowchart illustrating an operation of an electronic device according to various embodiments. Specifically, FIG. 13 is a flowchart illustrating a method for matching at least one V2X message with an object identified in an image.

Referring to a flowchart 1300 of an operation, in operation 1301, the processor 310 according to various embodiments may determine a region of interest, based on at least one V2X message, in response to determination to capture an image. For example, the processor 310 may analyze the at least one V2X message, determine whether an event occurs, and determine, as the region of interest, a region of a predetermined size including a location where the event has occurred.

After determining the region of interest, the processor 310 according to various embodiments may proceed to operation 1303 and start analyzing the at least one V2X message. After determining the region of interest, the processor 310 according to various embodiments may proceed to operation 1307 to obtain an image including the region of interest, and start analyzing the obtained image.

In operation 1303, the processor 310 according to various embodiments may calculate a distance from a location of the electronic device 201 to an external device and an angle from a movement direction of the electronic device 201 to the external device, based on the at least one V2X message. For example, the processor 310 may analyze the at least one V2X message to identify a location of the electronic device 201 and a location of the external device. For example, the processor 310 may calculate a distance from the location of the electronic device 201 to the external device through the calculated location of the electronic device 201 and the calculated location of the external device. The processor 310 according to various embodiments may analyze the at least one V2X message to identify a movement direction of the electronic device 201 and a movement direction of the external device. For example, the processor 310 may calculate an angle from the movement direction of the electronic device 201 to the external device. The processor 310 according to various embodiments may identify vehicle type or vehicle size information by analyzing the at least one V2X message in addition to information on the distance and angle from the electronic device 201 to the external device. In operation 1305, the processor 310 according to various embodiments may store, in a database, information on the external device, calculated based on the at least one V2X message. For example, the processor 310 may store, in a table format in a database, the information on the external device calculated based on the at least one V2X message.

In operation 1307, the processor 310 according to various embodiments may control at least one camera 340 to obtain an image including the region of interest, in response to determining the region of interest. In operation 1309, the processor 310 according to various embodiments may analyze the obtained image to determine a region corresponding to the region of interest. The processor 310 according to various embodiments may identify an object included in the determined region in operation 1311. In operation 1313, the processor 310 according to various embodiments may analyze the image to calculate a distance from a location of the electronic device 201 to the identified object and an angle from a movement direction of the electronic device 201 to the identified object. In operation 1315, the processor 310 according to various embodiments may store, in a database, information on the identified object calculated by analyzing the image. For example, the processor 310 may store, in a table format in a database, the information on the identified object calculated by analyzing the image. The information calculated by analyzing the image is a relative value rather than an absolute value, and may be stored by applying a weight to minimize an error with an actual value.

In operation 1317, the processor 310 according to various embodiments may compare and analyze data calculated by analyzing the at least one V2X message and data calculated by analyzing the image, and match the identified object in the image with V2X information included in the at least one V2X message.

For example, the processor 310 may match a data value relating to the identified object calculated by analyzing the image with a data value relating to the external device calculated by analyzing the at least one V2X message, wherein the data values have a minimum difference therebetween.

In operation 1319, the processor 310 according to various embodiments may generate an image with which the at least one V2X message matching the identified object is combined. For example, the processor 310 may generate a final image by marking the V2X information included in the at least one V2X message matching the identified object on a timestamp of the image.

For example, the processor 310 may mark the V2X information matching the identified object and the type of the occurred event on the timestamp of the image obtained through at least one camera, and generate the image with which the at least one V2X message is combined.

In the generated image, since the type of the event is marked, the image may be analyzed according to the type of the event, and since the V2X information included in the at least one message is marked, an image analysis based on the V2X information may be possible.

The processor 310 according to various embodiments may display the generated image through a display 370. The processor 310 according to various embodiments may transmit the generated image to a server (e.g., a MEC server).

Figure 14:
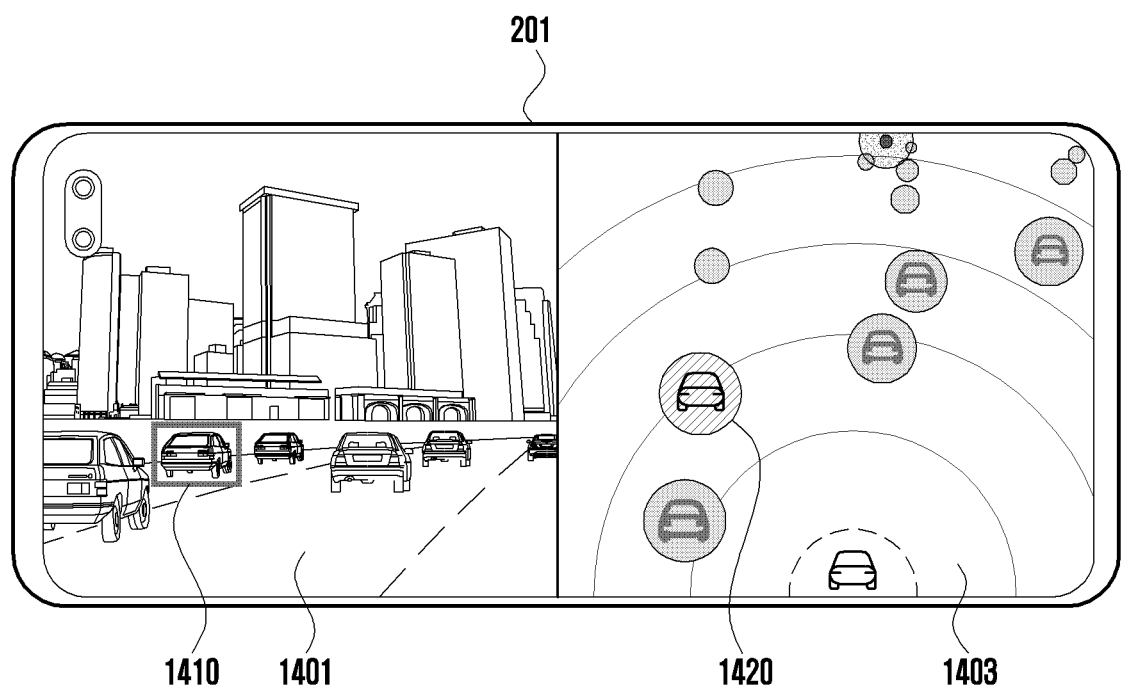
FIG. 14 illustrates an electronic device displaying an image with which at least one V2X message is combined, according to various embodiments.
Figure 15:
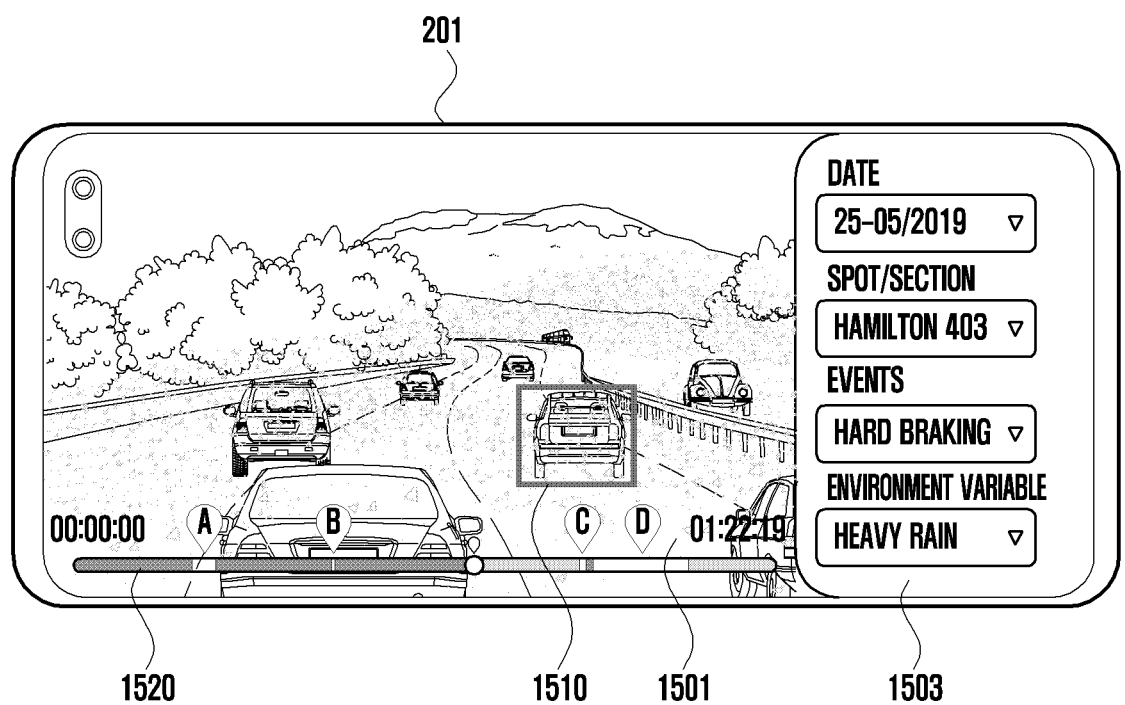
FIG. 15 illustrates an electronic device displaying an image with which at least one V2X message is combined, according to various embodiments.

FIG. 14 illustrates an electronic device displaying an image with which at least one V2X message is combined, according to various embodiments, and FIG. 15 illustrates an electronic device displaying an image with which at least one V2X message is combined, according to various embodiments. FIGS. 14 and 15 illustrate an assumption of a case where an electronic device is a smart phone attached in a vehicle, according to various embodiments.

Referring to FIG. 14, the electronic device 201 according to various embodiments may display a first user interface including an image with which a V2X message is combined, through a display (e.g., the display 370 of FIG. 3).

According to various embodiments, the electronic device may display a generated image in a first region 1401 of the first user interface.

According to various embodiments, the electronic device may display information on external devices obtained by analyzing at least one V2X message in a second region 1403 of the first user interface.

According to various embodiments, in the case of an external device in which an event has occurred, an object 1410 corresponding to the external device may be highlighted in the first region 1401. The external device 1420 may be highlighted even in the second region 1403.

According to various embodiments, when a user input for selecting the object 1410 in the first region 1401 or the external device 1420 in the second region 1403 is received, the electronic device may transmit a safety message to the selected external device.

Referring to FIG. 15, the processor 310 according to various embodiments may display a second user interface including an image with which at least one V2X message is combined.

The second user interface according to various embodiments can perform an index-based search. For example, the second user interface can perform a search based on an event occurrence time, an event occurrence location, an event type, or environment information. For example, the second user interface can perform a search through selection of a highlighted region of interest or object.

According to various embodiments, the processor 310 may display a generated image in a first region 1501 of the second user interface. The processor 310 may display an item for an index search in a second region 1503 of the second user interface.

According to various embodiments, the processor may display a timestamp 1520 of the image in a part of the first region 1501 of the second user interface. V2X information included in the at least one V2X message and the type of an event may be marked on the timestamp 1520. According to various embodiments, V2X information matched for each object may be displayed on an image displayed on the first region 1501 of the second user interface together. For example, V2X information matched for each object and including at least one of temporary ID information, a location, a speed, or lane information may be displayed together with the image.

Figure 16:
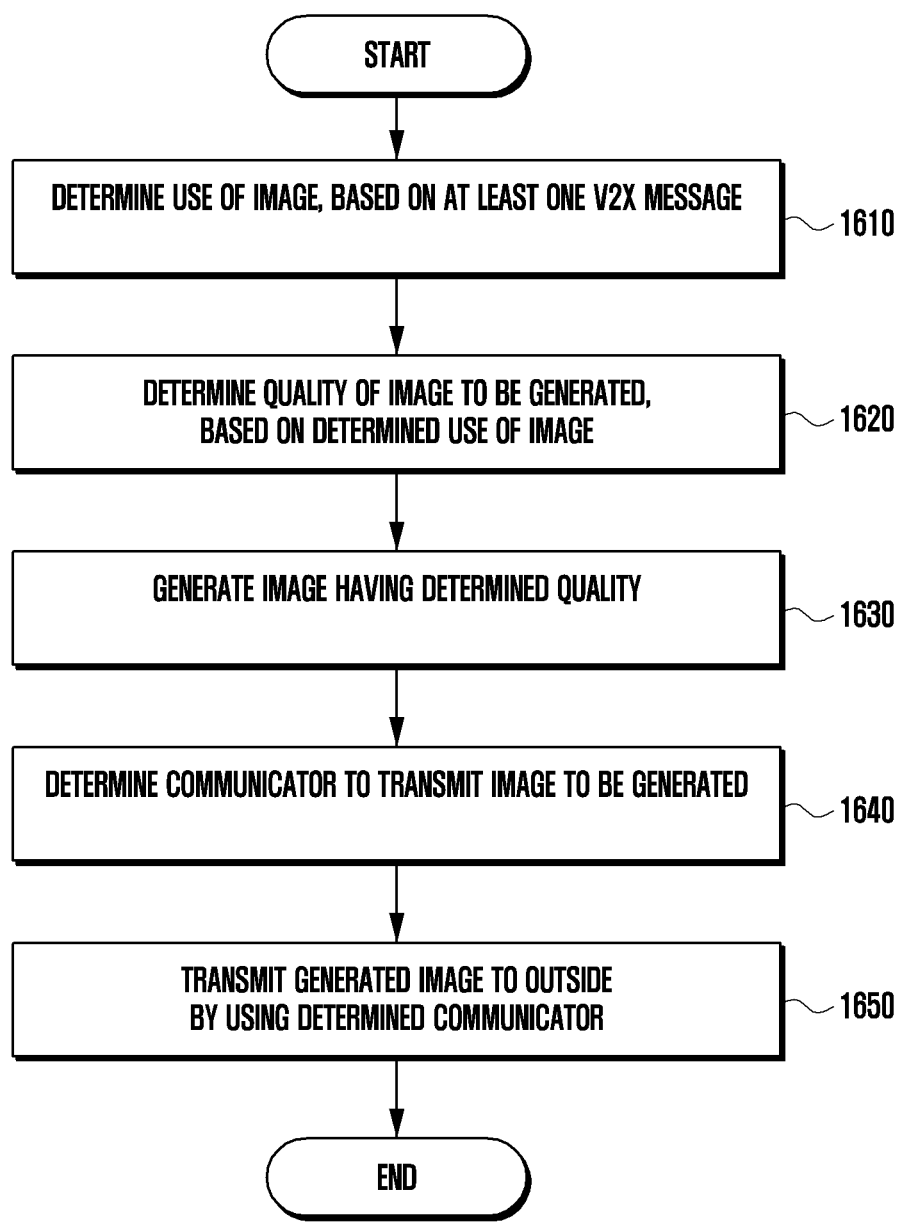
FIG. 16 is a flowchart illustrating an operation of an electronic device according to various embodiments.

FIG. 16 is a flowchart illustrating an operation of an electronic device according to various embodiments. Specifically, FIG. 16 illustrates a method for determining a communication means to transmit an image generated based on a use of an image.

Referring to a flowchart 1600 of an operation, in operation 1610, the processor 310 according to various embodiments may determine a use of an image, based on at least one V2X message. For example, the processor may determine whether the purpose of generating the image is characterized as being for public use. For example, the processor may analyze the at least one V2X message to determine the type of an occurred event, and determine the use of the image, based on the type of the occurred event.

In operation 1620, the processor 310 according to various embodiments may determine a quality of an image to be obtained, based on the determined use of the image. In the case where the image is for public use, since it is necessary to transmit the image in a V2X communication frequency band, the processor may determine to generate a low-quality image in consideration of a limited resource and a throughput of V2X communication. In the case where the image is not for public use (for example, the use for image streaming), the processor may determine to generate a high-quality image.

In operation 1630, the processor 310 according to various embodiments may generate an image having the determined quality. The generated image may be an image with which the at least one V2X message is combined.

In operation 1640, the processor 310 according to various embodiments may determine a communication means to transmit an image to be generated. In operation 1650, the processor 310 may transmit an image generated using the determined communication means to the outside.

For example, the processor 310 may determine a communication means, based on the determined use of the image. For example, in the case where the image is for public use, the processor may transmit the generated image to a dedicated roadside unit (RSU) through the V2X communication circuit 333. In this case, the electronic device 201 may perform the role of V2I.

For example, in the case where the image is not for public use, the processor may transmit the generated image to a server (e.g., a MEC server) through the cellular communication circuit 331 (e.g., a 5G communication circuit). In this case, the electronic device 201 may perform the role of V2N.

According to various embodiments, the processor 310 may generate both a high-quality image and a low-quality image, and perform operations of transmitting the high-quality image to the server through the cellular communication circuit, and transmitting the low-quality image to the RSU through the V2X communication circuit, together.

The electronic device 201 according to various embodiments disclosed in this document may include a first communication circuit (e.g., the V2X communication circuit 333 of FIG. 3) supporting V2X communication, a processor 310 operatively connected to the first communication circuit, and a memory 360 operatively connected to the processor 310, wherein the memory 360 stores instructions which, when executed, cause the processor 310 to: receive at least one V2X message through the first communication circuit; determine whether to capture an image, based on the at least one V2X message; in response to the determination to capture the image, determine a region of interest, based on the at least one V2X message; obtain an image including the determined region of interest, through at least one camera 340 electrically connected to the electronic device 201; identify an object included in the obtained image; match the identified object with the at least one V2X message; and generate an image with which the at least one V2X message matching the identified object is combined.

In the electronic device 201 according to various embodiments disclosed in this document, the instructions may be configured to cause the processor 310 to analyze the obtained image to determine a region corresponding to the region of interest, and identify an object included in the determined region.

In the electronic device 201 according to various embodiments disclosed in this document, the instructions may be configured to cause the processor 310 to determine whether an event occurs, based on the at least one V2X message, in response to determining that the event has occurred, identify a type of the occurred event, and determine whether to capture an image, based on the type of the occurred event.

In the electronic device 201 according to various embodiments disclosed in this document, the instructions may be configured to cause the processor 310 to identify environment information, based on the at least one V2X message, and determine whether to capture an image, based on the type of the occurred event and the environment information.

In the electronic device 201 according to various embodiments disclosed in this document, the instructions may be configured to cause the processor 310 to: analyze the obtained image to calculate a distance from a location of the electronic device 201 to the identified object and an angle from a movement direction of the electronic device 201 to the identified object; analyze the at least one V2X message to calculate a distance from the location of the electronic device 201 to an external device which has transmitted the at least one V2X message and an angle from the movement direction of the electronic device 201 to the external device; and compare the distance and angle calculated through the obtained image with the distance and angle calculated through the at least one V2X message; and match the identified object with the at least one V2X message, based on a result of the comparison.

In the electronic device 201 according to various embodiments disclosed in this document, the instructions may be configured to cause the processor 310 to mark the type of the occurred event and V2X information included in the at least one V2X message matching the identified object on a timestamp of the obtained image, in order to generate the image with which the at least one V2X message matching the identified object is combined.

The electronic device 201 according to various embodiments disclosed in this document may further include a display 370. In the electronic device 201 according to various embodiments, the instructions may be configured to cause the processor 310 to display the generated image through the display 370 and, in response to a user input for selecting an object included in the generated image, display V2X information matching the object.

In the electronic device 201 according to various embodiments disclosed in this document, the instructions may be configured to cause the processor 310 to, in response to the determination to capture the image, determine a quality of the image, based on at least one of the type of the occurred event, the environment information, or a relative speed with an external device which has transmitted the at least one V2X message.

In the electronic device 201 according to various embodiments disclosed in this document, the instructions may be configured to cause the processor 310 to adjust the quality of the image by adjusting at least one of a resolution or a frame rate.

The electronic device 201 according to various embodiments disclosed in this document may further include a second communication circuit (e.g., the cellular communication circuit 331 of FIG. 3) supporting cellular communication. In the electronic device 201 according to various embodiments, the instructions may be configured to cause the processor 310 to determine a use of an image to be generated, based on the at least one V2X message, determine the quality of the image to be generated, based on the determined use of the image, generate an image with which the at least one V2X message is combined and which has the determined quality, and determine a communication circuit to transmit the generated image, based on the use of the image.

In the electronic device 201 according to various embodiments disclosed in this document, the instructions may be configured to cause the processor 310 to periodically analyze the at least one V2X message to update a size and a location of the region of interest.

In the electronic device 201 according to various embodiments disclosed in this document, the instructions may be configured to cause the processor 310 to calculate a distance from a location of the electronic device 201 to a location of the external device which has transmitted the at least one V2X message and an angle from a movement direction of the electronic device 201 to the location of the external device, based on the at least one V2X message, and when the calculated distance and angle correspond to a preconfigured range, control the at least one camera 340 to start image capturing for the determined region of interest.

In the electronic device 201 according to various embodiments disclosed in this document, the instructions may be configured to cause the processor 310 to control the at least one camera 340 to end the image capturing when the calculated distance and angle are out of the preconfigured range.

In the electronic device 201 according to various embodiments disclosed in this document, the instructions may be configured to cause the processor 310 to control the at least one camera 340 to end the image capturing, in response to the elapse of a preconfigured time from when the image capturing is started.

An image processing method of an electronic device 201 according to various embodiments disclosed in this document may include: receiving at least one V2X message; determining whether to capture an image, based on the at least one V2X message; in response to the determination to capture the image, determining a region of interest, based on the at least one V2X message; obtaining an image including the determined region of interest, through at least one camera 340 electrically connected to the electronic device 201; identifying an object included in the obtained image; matching the identified object with the at least one V2X message; and generating an image with which the least one V2X message matching the identified object is combined.

In the image processing method of the electronic device 201 according to various embodiments disclosed in this document, the identifying may include analyzing the obtained image to determine a region corresponding to the region of interest, and identifying an object included in the determined region.

In the image processing method of the electronic device 201 according to various embodiments disclosed in this document, the determining of whether to capture the image may include determining whether an event occurs, based on the at least one V2X message, identifying a type of the occurred event, in response to determining that the event has occurred, and determining whether to capture an image, based on the type of the occurred event.

In the image processing method of the electronic device 201 according to various embodiments disclosed in this document, the matching may include: analyzing the obtained image to calculate a distance from a location of the electronic device 201 to the identified object and an angle from a movement direction of the electronic device 201 to the identified object; analyzing the at least one V2X message to calculate a distance from the location of the electronic device 201 to an external device which has transmitted the at least one V2X message and an angle from the movement direction of the electronic device 201 to the external device; comparing the distance and angle calculated through the obtained image with the distance and angle calculated through the at least one V2X message; and matching the identified object with the at least one V2X message, based on a result of the comparison.

In the image processing method of the electronic device 201 according to various embodiments disclosed in this document, the generating may include marking the type of the occurred event and V2X information included in the at least one V2X message matching the identified object on a timestamp of the obtained image, in order to generate the image with which the at least one V2X message matching the identified object is combined.

The image processing method of the electronic device 201 according to various embodiments disclosed in this document may further include displaying the generated image through a display 370, and in response to a user's input for selecting an object included in the generated image, displaying V2X information matching the object.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

An electronic device according to the first embodiment disclosed in this document may include a first communicator supporting V2X communication, a controller operatively connected to the first communicator, and a memory operatively connected to the controller, wherein the memory stores instructions which, when executed, cause the controller to: receive at least one V2X message through the first communicator; determine whether to capture an image, based on the at least one V2X message; in response to the determination to capture the image, determine a region of interest, based on the at least one V2X message; obtain an image including the determined region of interest, through at least one imaging device electrically connected to the electronic device; identify an object included in the obtained image; match the identified object with the at least one V2X message; and generate an image with which the at least one V2X message matching the identified object is combined.

An electronic device according to the second embodiment disclosed in this document includes, further to the features of the electronic device according to the first embodiment or another embodiment disclosed in this document, a feature wherein the instructions are configured to cause the controller to analyze the obtained image to determine a region corresponding to the region of interest, and identify an object included in the determined region.

An electronic device according to the third embodiment disclosed in this document includes, further to the features of the electronic device according to the first embodiment, the second embodiment, or another embodiment disclosed in this document, a feature wherein the instructions are configured to cause the controller to determine whether an event occurs, based on the at least one V2X message, in response to determining that the event has occurred, identify a type of the occurred event, and determine whether to capture an image, based on the type of the occurred event.

An electronic device according to the fourth embodiment disclosed in this document includes, further to the features of the electronic device according to the first embodiment to the third embodiment or another embodiment disclosed in this document, a feature wherein the instructions are configured to cause the controller to identify environment information, based on the at least one V2X message, and determine whether to capture an image, based on the type of the occurred event and the environment information.

An electronic device according to the fifth embodiment disclosed in this document includes, further to the features of the electronic device according to the first embodiment to the third embodiment or another embodiment disclosed in this document, a feature wherein the instructions are configured to cause the controller to analyze the obtained image to calculate a distance from a location of the electronic device to the identified object and an angle from a movement direction of the electronic device to the identified object, analyze the at least one V2X message to calculate a distance from the location of the electronic device to an external device which has transmitted the at least one V2X message and an angle from the movement direction of the electronic device to the external device, compare the distance and angle calculated through the obtained image with the distance and angle calculated through the at least one V2X message, and match the identified object with the at least one V2X message, based on a result of the comparison.

An electronic device according to the sixth embodiment disclosed in this document includes, further to the features of the electronic device according to the first embodiment to the fifth embodiment or another embodiment disclosed in this document, a feature wherein the instructions are configured to cause the controller to mark the type of the occurred event and V2X information included in the at least one V2X message matching the identified object on a timestamp of the obtained image, in order to generate the image with which the at least one V2X message matching the identified object is combined.

An electronic device according to the seventh embodiment disclosed in this document includes, further to the features of the electronic device according to the first embodiment to the sixth embodiment or another embodiment disclosed in this document, a feature wherein the instructions are configured to cause the controller to display the generated image through a display, and in response to a user input for selecting an object included in the generated image, display V2X information matching the object.

An electronic device according to the eighth embodiment disclosed in this document includes, further to the features of the electronic device according to the fourth embodiment or another embodiment disclosed in this document, a feature wherein the instructions are configured to cause the controller to, in response to the determination to capture the image, determine a quality of the image, based on at least one of the type of the occurred event, the environment information, or a relative speed with an external device which has transmitted the at least one V2X message.

An electronic device according to the ninth embodiment disclosed in this document includes, further to the features of the electronic device according to the eighth embodiment or another embodiment disclosed in this document, a feature wherein the instructions are configured to cause the controller to adjust the quality of the image by adjusting at least one of a resolution or a frame rate.

An electronic device according to the tenth embodiment disclosed in this document may include, further to the electronic device according to the first embodiment to the third embodiment or another embodiment disclosed in this document, a second communicator supporting cellular communication, wherein the instructions are configured to cause the controller to determine a use of an image to be generated, based on the at least one V2X message, determine a quality of the image to be generated, based on the determined use of the image, generate an image with which the at least one V2X message is combined and which has the determined quality, and determine a communicator to transmit the generated image, based on the use of the image.

An electronic device according to the eleventh embodiment disclosed in this document includes, further to the features of the electronic device according to the first embodiment to the tenth embodiment or another embodiment disclosed in this document, a feature wherein the instructions are configured to cause the controller to periodically analyze the at least one V2X message to update a size and a location of the region of interest.

An electronic device according to the twelfth embodiment disclosed in this document includes, further to the features of the electronic device according to the first embodiment to the fourth embodiment or another embodiment disclosed in this document, a feature wherein the instructions are configured to cause the controller to calculate a distance from a location of the electronic device to a location of an external device which has transmitted the at least one V2X message and an angle from a movement direction of the electronic device to the location of the external device, based on the at least one V2X message, and when the calculated distance and angle correspond to a preconfigured range, control the at least one imaging device to start image capturing for the determined region of interest.

An electronic device according to the thirteenth embodiment disclosed in this document includes, further to the features of the electronic device according to the twelfth embodiment or another embodiment disclosed in this document, a feature wherein the instructions are configured to cause the controller to control the at least one imaging device to end the image capturing when the calculated distance and angle are out of the preconfigured range.

An electronic device according to the fourteenth embodiment disclosed in this document includes, further to the features of the electronic device according to the thirteenth embodiment or another embodiment disclosed in this document, a feature wherein the instructions are configured to cause the controller to control the at least one imaging device to end the image capturing, in response to an elapse of a preconfigured time from when the image capturing is started.

An image processing method according to the first embodiment disclosed in this document may include: receiving at least one V2X message; determining whether to capture an image, based on the at least one V2X message; in response to the determination to capture the image, determining a region of interest, based on the at least one V2X message; obtaining an image including the determined region of interest, through at least one imaging device electrically connected to the electronic device; identifying an object included in the obtained image; matching the identified object with the at least one V2X message; and generating an image with which the at least one V2X message matching the identified object is combined.

An image processing method according to the second embodiment disclosed in this document includes, further to the features of the image processing method according to the first embodiment or another embodiment disclosed in the this document, a feature wherein the identifying includes analyzing the obtained image to determine a region corresponding to the region of interest, and identifying an object included in the determined region.

An image processing method according to the third embodiment disclosed in this document includes, further to the features of the image processing method according to the first embodiment, the second embodiment, or another embodiment disclosed in the this document, a feature wherein the determining of whether to capture the image includes determining whether an event occurs, based on the at least one V2X message, identifying a type of the occurred event, in response to determining that the event has occurred, and determining whether to capture an image, based on the type of the occurred event.

An image processing method according to the fourth embodiment disclosed in this document includes, further to the features of the image processing method according to the first embodiment to the third embodiment or another embodiment disclosed in the this document, a feature wherein the matching includes analyzing the obtained image to calculate a distance from a location of the electronic device to the identified object and an angle from a movement direction of the electronic device to the identified object, analyzing the at least one V2X message to calculate a distance from the location of the electronic device to an external device which has transmitted the at least one V2X message and an angle from the movement direction of the electronic device to the external device, comparing the distance and angle calculated through the obtained image with the distance and angle calculated through the at least one V2X message, and matching the identified object with the at least one V2X message, based on a result of the comparison.

An image processing method according to the fifth embodiment disclosed in this document includes, further to the features of the image processing method according to the first embodiment to the fourth embodiment or another embodiment disclosed in the this document, a feature wherein the generating includes marking the type of the occurred event and V2X information included in the at least one V2X message matching the identified object on a timestamp of the obtained image, in order to generate the image with which the at least one V2X message matching the identified object is combined.

An image processing method according to the sixth embodiment disclosed in this document may include, further to the image processing method according to the first embodiment to the fifth embodiment or another embodiment disclosed in the this document, displaying the generated image through a display, and in response to a user's input for selecting an object included in the generated image, displaying V2X information matching the object.

The scope of protection is defined by the appended independent claims. Further features are specified by the appended dependent claims. Example implementations can be realized by including one or more features of any claim taken jointly and severally in any and all permutations.

The examples described in this disclosure include non-limiting example implementations of components corresponding to one or more features specified by the appended independent claims and these features (or their corresponding components) either individually or in combination may contribute to ameliorating one or more technical problems deducible by the skilled person from this disclosure.

Furthermore, one or more selected components of any one example described in this disclosure may be combined with one or more selected components of any other one or more example described in this disclosure, or alternatively may be combined with features of an appended independent claim to form a further alternative example.

Further example implementations can be realized by including one or more components of any herein described implementation taken jointly and severally in any and all permutations. Yet further example implementations may also be realized by combining features of one or more of the appended claims with one or more selected components of any example implementation described herein.

In forming such further example implementations, some components of any example implementation described in this disclosure may be omitted. The one or more components that may be omitted are those components that a skilled person would directly and unambiguously recognize as being not, as such, indispensable for the function of the present technique in the light of a technical problem discernible from this disclosure. A skilled person would recognize that replacement or removal of such an omitted components does not require modification of other components or features of the further alternative example to compensate for the change. Thus further example implementations may be included, according to the present technique, even if the selected combination of features and/or components is not specifically recited in this disclosure.

Two or more physically distinct components in any described example implementation of this disclosure may alternatively be integrated into a single component where possible, provided that the same function is performed by the single component thus formed. Conversely, a single component of any example implementation described in this disclosure may alternatively be implemented as two or more distinct components to achieve the same function, where appropriate.

The invention claimed is:

1. An electronic device comprising:
a first communicator configured to support V2X communication;
a controller operatively connected to the first communicator; and
a memory operatively connected to the controller,
wherein the memory stores instructions which, when executed, cause the controller to:
receive at least one V2X message through the first communicator;
determine whether to capture an image, based on the at least one V2X message;
in response to the determination to capture the image, determine a region of interest, based on the at least one V2X message;
obtain an image including the determined region of interest, through at least one imaging device electrically connected to the electronic device;
identify an object included in the obtained image;
match the identified object with the at least one V2X message; and
generate an image with which the at least one V2X message matching the identified object is combined.

2. The electronic device of claim 1, wherein the instructions are configured to cause the controller to:
analyze the obtained image to determine a region corresponding to the region of interest; and
identify an object included in the determined region.

3. The electronic device of claim 1, wherein the instructions are configured to cause the controller to:
determine whether an event occurs, based on the at least one V2X message;
in response to determining that the event has occurred, identify a type of the occurred event; and
determine whether to capture an image, based on the type of the occurred event.

4. The electronic device of claim 3, wherein the instructions are configured to cause the controller to:
identify environment information, based on the at least one V2X message; and
determine whether to capture an image, based on the type of the occurred event and the environment information.

5. The electronic device of claim 3, wherein the instructions are configured to cause the controller to:
analyze the obtained image to calculate a distance from a location of the electronic device to the identified object and an angle from a movement direction of the electronic device to the identified object;
analyze the at least one V2X message to calculate a distance from the location of the electronic device to an external device which has transmitted the at least one V2X message and an angle from the movement direction of the electronic device to the external device;
compare the distance and angle calculated through the obtained image with the distance and angle calculated through the at least one V2X message; and
match the identified object with the at least one V2X message, based on a result of the comparison.

6. The electronic device of claim 5, wherein the instructions are configured to cause the controller to mark the type of the occurred event and V2X information included in the at least one V2X message matching the identified object on a timestamp of the obtained image, in order to generate the image with which the at least one V2X message matching the identified object is combined.

7. The electronic device of claim 6, further comprising a display device,
wherein the instructions are configured to cause the controller to:
display the generated image through the display device; and
in response to a user input for selecting an object included in the generated image, display V2X information matching the object.

8. The electronic device of claim 4, wherein the instructions are configured to cause the controller to, in response to the determination to capture the image, determine a quality of the image, based on at least one of the type of the occurred event, the environment information, or a relative speed with an external device which has transmitted the at least one V2X message.

9. The electronic device of claim 8, wherein the instructions are configured to cause the controller to adjust the quality of the image by adjusting at least one of a resolution or a frame rate.

10. The electronic device of claim 1, further comprising a second communicator configured to support cellular communication,
wherein the instructions are configured to cause the controller to:
determine a use of an image to be generated, based on the at least one V2X message;
determine a quality of the image to be generated, based on the determined use of the image;
generate an image with which the at least one V2X message is combined and which has the determined quality; and
determine a communicator to transmit the generated image, based on the use of the image.

11. The electronic device of claim 1, wherein the instructions are configured to cause the controller to periodically analyze the at least one V2X message to update a size and a location of the region of interest.

12. The electronic device of claim 1, wherein the instructions are configured to cause the controller to:
calculate a distance from a location of the electronic device to a location of an external device which has transmitted the at least one V2X message and an angle from a movement direction of the electronic device to the location of the external device, based on the at least one V2X message; and
when the calculated distance and angle correspond to a preconfigured range, control the at least one imaging device to start image capturing for the determined region of interest.

13. The electronic device of claim 12, wherein the instructions are configured to cause the controller to, when the calculated distance and angle are out of the preconfigured range, control the at least one imaging device to end the image capturing.

14. The electronic device of claim 13, wherein the instructions are configured to cause the controller to control the at least one imaging device to end the image capturing, in response to a lapse of a preconfigured time from when the image capturing is started.

15. An image processing method of an electronic device, the method comprising:
receiving at least one V2X message;
determining whether to capture an image, based on the at least one V2X message;
in response to the determination to capture the image, determining a region of interest, based on the at least one V2X message;
obtaining an image including the determined region of interest, through at least one imaging device electrically connected to the electronic device;
identifying an object included in the obtained image;
matching the identified object with the at least one V2X message; and
generating an image with which the at least one V2X message matching the identified object is combined.

16. The image processing method of claim 15, wherein the identifying comprises:
analyzing the obtained image to determine a region corresponding to the region of interest; and
identifying an object included in the determined region.

17. The image processing method of claim 15, wherein the determining of whether to capture the image comprises:
determining whether an event occurs, based on the at least one V2X message;
in response to determining that the event has occurred, identifying a type of the occurred event; and
determining whether to capture an image, based on the type of the occurred event.

18. The image processing method of claim 17, wherein the matching comprises:
analyzing the obtained image to calculate a distance from a location of the electronic device to the identified object and an angle from a movement direction of the electronic device to the identified object;
analyzing the at least one V2X message to calculate a distance from the location of the electronic device to an external device which has transmitted the at least one V2X message and an angle from the movement direction of the electronic device to the external device;
comparing the distance and angle calculated through the obtained image with the distance and angle calculated through the at least one V2X message; and
matching the identified object with the at least one V2X message, based on a result of the comparison.

19. The image processing method of claim 18, wherein the generating comprises marking the type of the occurred event and V2X information included in the at least one V2X message matching the identified object on a timestamp of the obtained image, in order to generate the image with which the at least one V2X message matching the identified object is combined.

20. The image processing method of claim 19, further comprising:
displaying the generated image through a display; and
in response to a user's input for selecting an object included in the generated image, displaying V2X information matching the object.

* * * * *